United States Patent
Yun et al.

(12)

(10) Patent No.: US 10,296,127 B2
(45) Date of Patent: May 21, 2019

(54) OBJECT CONTROL METHOD PERFORMED IN DEVICE INCLUDING TRANSPARENT DISPLAY, THE DEVICE, AND COMPUTER READABLE RECORDING MEDIUM THEREOF

(71) Applicant: SAMSUNG ELECTRONICS CO., LTD., Suwon-si (KR)

(72) Inventors: Il-kook Yun, Suwon-si (KR); Chang-soo Lee, Seosan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 344 days.

(21) Appl. No.: 13/858,258

(22) Filed: Apr. 8, 2013

(65) Prior Publication Data

US 2013/0265284 A1   Oct. 10, 2013

(30) Foreign Application Priority Data

Apr. 7, 2012  (KR) .......... 10-2012-0036405
Apr. 4, 2013  (KR) .......... 10-2013-0036716

(51) Int. Cl.
G06F 3/041   (2006.01)
G06F 3/0488  (2013.01)

(52) U.S. Cl.
CPC .......... *G06F 3/0416* (2013.01); *G06F 3/0488* (2013.01)

(58) Field of Classification Search
CPC .......................... G06F 3/0488; G06F 3/0416
See application file for complete search history.

(56) References Cited

U.S. PATENT DOCUMENTS 6,963,937 B1 * 11/2005 Kamper et al. ............... 710/73
9,191,473 B2    11/2015 Shimada
(Continued)

FOREIGN PATENT DOCUMENTS

CN      1264071 A    8/2000
CN    101794181 A    8/2010
(Continued)

OTHER PUBLICATIONS

International Search Report, dated Jul. 11, 2013, issued by the International Searching Authority in counterpart International Application No. PCT/KR2013/002907.
(Continued)

*Primary Examiner* — Mihir K Rayan
(74) *Attorney, Agent, or Firm* — Sughrue Mion, PLLC

(57) ABSTRACT

An object control method performed by a device including a display, the device, and a computer readable recording medium thereof are provided. The object control method includes: displaying at least one object on the display; receiving an input through an input interface of the display, the input interface comprising at least one of a first input interface and a second input interface; and in response to receiving the input, performing a first function associated with a predetermined input interface of the device if the input interface is the first input interface and the predetermined input interface is the first input interface, and performing a second function associated with the predetermined input interface if the input interface is second input interface and the predetermined input interface is the second input interface.

24 Claims, 27 Drawing Sheets

(56) References Cited

U.S. PATENT DOCUMENTS

| | | | |
|---|---|---|---|
| 2003/0234768 A1* | 12/2003 | Rekimoto | G06F 1/1626 345/169 |
| 2007/0083911 A1* | 4/2007 | Madden et al. | 725/135 |
| 2008/0005690 A1 | 1/2008 | Van Vugt | |
| 2008/0129686 A1* | 6/2008 | Han | G06F 3/0482 345/156 |
| 2008/0270900 A1 | 10/2008 | Wezowski | |
| 2008/0295015 A1* | 11/2008 | Liu et al. | 715/772 |
| 2009/0002335 A1* | 1/2009 | Chaudhri | G06F 3/04815 345/173 |
| 2009/0228828 A1 | 9/2009 | Beatty et al. | |
| 2009/0235281 A1 | 9/2009 | Lu et al. | |
| 2010/0056220 A1* | 3/2010 | Oh | G06F 1/1616 455/566 |
| 2010/0177049 A1* | 7/2010 | Levy | G06F 3/0488 345/173 |
| 2010/0188353 A1* | 7/2010 | Yoon | G06F 3/04883 345/173 |
| 2010/0277420 A1 | 11/2010 | Charlier et al. | |
| 2011/0050599 A1* | 3/2011 | Sip | G06F 1/1626 345/173 |
| 2011/0074716 A1 | 3/2011 | Ono | |
| 2011/0077083 A1 | 3/2011 | Ahn et al. | |
| 2011/0109567 A1 | 5/2011 | Kim | |
| 2011/0126135 A1 | 5/2011 | Chambers et al. | |
| 2011/0161849 A1 | 6/2011 | Stallings et al. | |
| 2011/0163986 A1* | 7/2011 | Lee et al. | 345/173 |
| 2011/0175831 A1 | 7/2011 | Miyazawa et al. | |
| 2011/0205162 A1* | 8/2011 | Waller et al. | 345/173 |
| 2011/0256848 A1 | 10/2011 | Bok et al. | |
| 2011/0279388 A1 | 11/2011 | Jung et al. | |
| 2012/0026111 A1 | 2/2012 | Kasahara et al. | |
| 2012/0032908 A1 | 2/2012 | Joo et al. | |
| 2012/0052917 A1 | 3/2012 | Kim | |
| 2012/0056830 A1* | 3/2012 | Suzuki | G06F 1/1626 345/173 |
| 2012/0060089 A1* | 3/2012 | Heo | G06F 1/1647 715/702 |
| 2014/0009415 A1* | 1/2014 | Nishida | G06F 3/04886 345/173 |

FOREIGN PATENT DOCUMENTS

| | | |
|---|---|---|
| CN | 102004614 A | 4/2011 |
| CN | 102360254 A | 2/2012 |
| CN | 102696004 A | 9/2012 |
| EP | 2211530 A1 | 7/2010 |
| EP | 2282256 A1 | 2/2011 |
| EP | 2341418 A1 | 7/2011 |
| EP | 2423795 A2 | 2/2012 |
| EP | 2 426 597 A1 | 3/2012 |
| EP | 2426898 A2 | 3/2012 |
| JP | 2000-231428 A | 8/2000 |
| JP | 2003-296022 A | 10/2003 |
| JP | 2003-330611 A | 11/2003 |
| JP | 2008-097202 A | 4/2008 |
| JP | 2009-187290 A | 8/2009 |
| JP | 2009-223426 A | 10/2009 |
| JP | 2010-008790 A | 1/2010 |
| JP | 2011-070609 A | 4/2011 |
| JP | 2011-076233 A | 4/2011 |
| JP | 2012-230519 A | 11/2012 |
| KR | 10-2005-0089914 A | 9/2005 |
| KR | 1020100086639 A | 8/2010 |
| KR | 10-2011-0081040 A | 7/2011 |
| KR | 1020120020801 A | 3/2012 |
| SG | 89310 A | 6/2002 |
| WO | 2011/083975 A2 | 7/2011 |

OTHER PUBLICATIONS

Written Opinion, dated Jul. 11, 2013, issued by the International Searching Authority in counterpart International Application No. PCT/KR2013/002907.

Communication dated Jan. 23, 2017, issued by the State Intellectual Property Office of P.R. China in counterpart Chinese Application No. 201380018937.5.

Communication dated Jan. 23, 2017, issued by the Japanese Patent Office in counterpart Japanese Application No. 2015-504507.

Communication dated Jul. 14, 2017 by the Japanese Patent Office in counterpart Japanese Patent Application No. 2015-504507.

Communication dated Sep. 1, 2017 by the State Intellectual Property Office of P.R. China in counterpart Chinese Patent Application No. 201380018937.5.

Communication dated Dec. 13, 2017, issued by the European Patent Office in counterpart European Application No. 13162552.7.

Communication dated Mar. 13, 2018, issued by the European Patent Office in counterpart European Application No. 13162552.7.

Rick Strahl "Getting and setting max zIndex with jQuery" West Wind Technologies—Rick Strahl's Web Log, Aug. 31, 2009, (8 pages total) Retrieved from Internet: URL: https://weblog.westwind.com/posts/2009/Aug/31/Getting-and-setting-max-zIndex-with-jQuery [retrieved on Feb. 26, 2018].

Communication dated Mar. 15, 2018, issued by the State Intellectual Property Office of People's Republic of China in counterpart Application No. 201380018937.5.

* cited by examiner

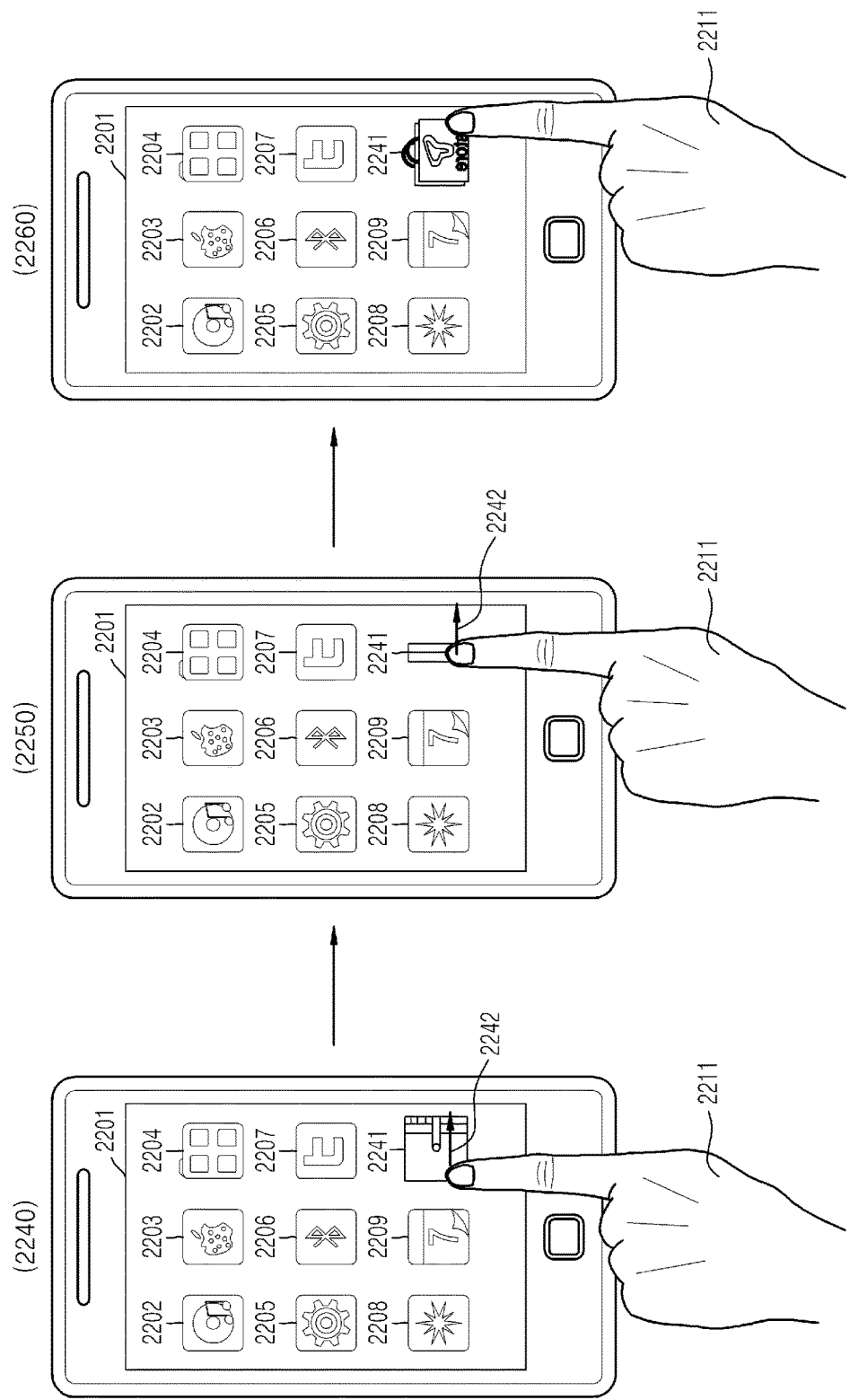

OBJECT CONTROL METHOD PERFORMED IN DEVICE INCLUDING TRANSPARENT DISPLAY, THE DEVICE, AND COMPUTER READABLE RECORDING MEDIUM THEREOF

CROSS-REFERENCE TO RELATED PATENT APPLICATION

This application claims priority from Korean Patent Applications No. 10-2013-0036716, filed on Apr. 4, 2013, and No. 10-2012-0036405, filed on Apr. 7, 2012, in the Korean Intellectual Property Office, the disclosure of which is incorporated herein by reference in its entirety.

BACKGROUND

1. Field

Apparatuses and methods consistent with exemplary embodiments relate to a device including a transparent display, and more particularly to, an object control method in a device including a transparent display, the device, and a computer readable recording medium thereof.

2. Description of the Related Art

Next generation display devices including transparent displays have recently been developed. A transparent display has a degree of transparency that enables a viewer to see through the display and view objects behind the display.

A device that includes the transparent display may be any device that that performs operations including recognizing information, processing information, and transferring information. The operations may also be performed by using transparent electronic elements.

The availability of transparent displays has created a need for new and innovative methods of interacting with devices including a transparent display and for expanding the functionality of a user interfaces on devices including the transparent display.

SUMMARY

One or more exemplary embodiments provide an object control method based on input such as touches on a front side, a rear side, and both sides of a device including a transparent display, the device, and a computer readable recording medium thereof.

One or more exemplary embodiments also provide a guide display method according to a state of an object or a display in a device including a transparent display, the device, and a computer readable recording medium thereof.

One or more exemplary embodiments also provide an object control method using a touch interface that is set for each object in a device including a transparent display, the device, and a computer readable recording medium thereof.

According to an aspect of an exemplary embodiment, there is provided an object control method performed by a device including a display, the method including: displaying at least one object on the display; receiving an input through an input interface of the display, the input interface comprising at least one of a first input interface and a second input interface; and in response to receiving the input, performing a first function associated with a predetermined input interface of the device if (i) the input interface is the first input interface and (ii) the predetermined input interface is the first input interface, and performing a second function associated with the predetermined input interface if (i) the input interface is second input interface and (ii) the predetermined input interface is the second input interface.

The performing may also include performing a third function associated with the predetermined input interface if (i) the input interface is both the first input interface and second input interface and (ii) the predetermined input interface is both the first input interface and second input interface.

The display may be a transparent display.

The first input interface may be one of a front surface and a back surface of the transparent display, and the second input interface may be another of one of the front surface and the back surface of the transparent display.

The input may correspond to the at least one object, and the predetermined input interface may correspond to the at least one object and may be set according to at least one of a display environment of the at least one object and an operation of the at least one object. The display environment may be an active application displayed on the display.

The at least one object may include a first object and a second object that is displayed on a front surface of the first object, and the second function may include changing a display status of the second object.

The at least one object may include a first window displayed on a first layer that is partially overlapping a second window displayed on a second layer below the first layer, and the second function may include moving the second window.

The at least one object may include a first window displayed on a first layer that is partially overlapping a second window displayed on a second layer below the first layer, and the second function may include displaying the second window above the first window.

The input may include touching more than a predetermined area of the second input interface, and the second function may include setting a transparency of the display as a maximum value. If the input that touches more than the predetermined area of the second input interface is not maintained for more than a predetermined period of time, the second function may further include returning to a screen before the touching of the second input interface.

The method may further include displaying an editing window comprising information regarding the predetermined input interface with respect to the at least one object in response to an input interface editing request with respect to the at least one object; and updating the information regarding the predetermined input interface with respect to the at least one object according to an input of the user into the editing window.

The at least one object may include a first object and a second object, the input may include a first input with respect to the first object received through the first input interface and a second input with respect to the second object received through the second input interface, the first function may include controlling the first object according to the first input received through the first input interface concurrently with the second object, and the second function may include controlling the second object according to the second input received through the second input interface concurrently with the first object.

The input may include a gesture with respect to the at least one object, the gesture may include moving more than a predetermined length in one direction through the predetermined input interface, the first function may include changing the predetermined input interface to the second input interface by rotating the at least one object in a direction corresponding to the gesture, and the second function may include changing the predetermined input interface to the first input interface by rotating the at least one object in a direction corresponding to the gesture.

The second function may include variably displaying a guide corresponding to the input based on a status of the at least one object or a status of the display.

The second function may include displaying a guide corresponding to a location of the input.

The method may be embodied on a non-transitory computer readable medium including instructions for performing the method.

According to an aspect of another exemplary embodiment, there is provided a device which performs an object control method is provided, the device including: a display which displays at least one object, an input interface which receives an input through at least one of a first input interface and a second input interface, a storage which stores a predetermined input interface, a processor which, in response to receiving the input, performs a first function associated with the predetermined input interface if (i) the input interface is the first input interface and (ii) the predetermined input interface is the first input interface, and a second function associated with the predetermined input interface if (i) the input interface is second input interface and (ii) the predetermined input interface is the second input interface.

The processor may also perform a third function associated with the predetermined input interface if (i) the input interface is both the first input interface and second input interface and (ii) the predetermined input interface is both the first input interface and second input interface.

The display may include a transparent display.

The first input interface may be one of a front surface and a back surface of the transparent display, and the second input interface may be another of one of the front surface and the back surface of the transparent display.

The second function may include variably displaying a guide corresponding to the input based on a status of the at least one object or a status of the display.

The second function may include displaying a guide corresponding to a location of the input.

The input may include touching more than a predetermined area of the second input interface, and the second function may include setting a transparency of the display as a maximum value. Additionally, if the input that touches more than the predetermined area of the second input interface is not maintained for more than a predetermined period of time, the second function may also include returning to a screen before the touching of the second input interface.

The input may correspond to the at least one object, and the predetermined input interface may also correspond to the at least one object and may be set according to at least one of a display environment of the at least one object and an operation of the at least one object.

The at least one object may include a first object and a second object, and the second function may include changing a display status of the second object that is displayed on a front surface of the first object.

The at least one object may include a first window displayed on a first layer that is partially overlapping a second window displayed on a second layer below the first layer, and the second function may include moving the second window.

The at least one object may include a first window displayed on a first layer that is partially overlapping a second window displayed on a second layer below the first layer, and the second function may include moving the second window from the second layer below the first layer and displaying the second window above the first window.

The processor, in response to an input interface editing request with respect to the at least one object, may also perform: displaying an editing window comprising information regarding the predetermined input interface with respect to the at least one object; and updating the information regarding the predetermined input interface with respect to the at least one object according to an input of the user into the editing window.

BRIEF DESCRIPTION OF THE DRAWINGS

The above and/or other aspects will become more apparent by describing in detail exemplary embodiments with reference to the attached drawings in which:

FIGS. 22A and 22B illustrate examples of screens displayed during the changing of a user input interface using the object control method of FIG. 21;

DETAILED DESCRIPTION OF EXEMPLARY EMBODIMENTS

Figure 1:
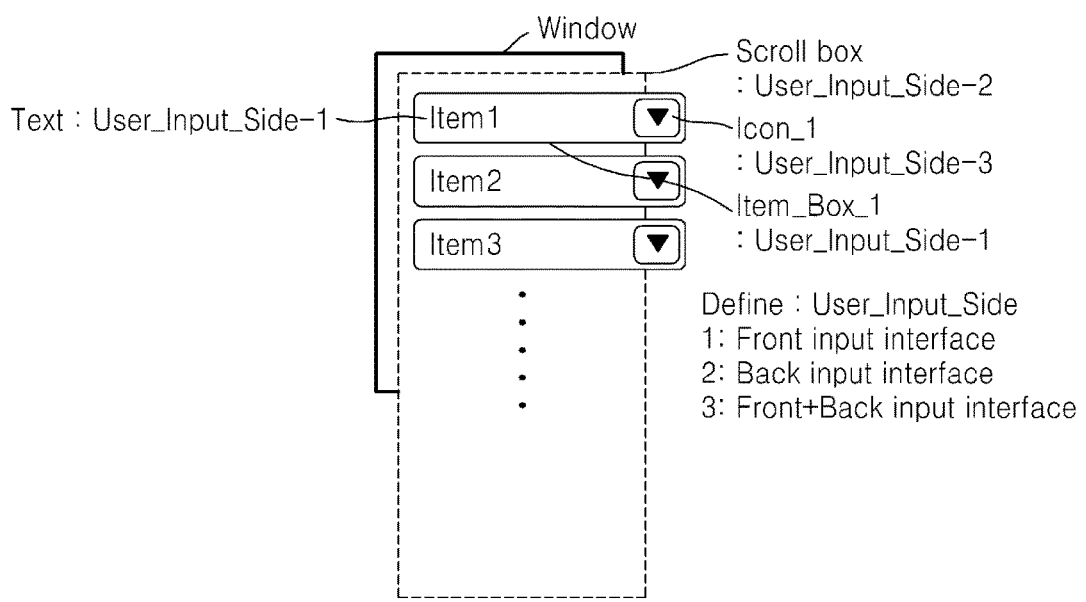
FIG. 1 is a diagram illustrating objects and setting a user input interface of an object, according to an exemplary embodiment.

Exemplary embodiments allow for various changes and numerous modifications. Particular exemplary embodiments will be illustrated in the drawings and described in the written description. However, the exemplary embodiments are not intended to limit the inventive concept or the claims, and it will be appreciated that all changes, equivalents, and substitutes that do not depart from the spirit and technical scope of the inventive concept are encompassed in the exemplary embodiments. In the description of the exemplary embodiments, certain detailed explanations of related art are omitted when it is deemed that they may unnecessarily obscure the essence of the inventive concept.

Terms such as "first" and "second" are used herein to describe a variety of constituent elements, but the constituent elements are not limited by the terms. The terms are used only for the purpose of distinguishing one constituent element from another constituent element.

Some of the terms used herein are general terms that are widely used in the technical art related to the exemplary embodiments. However, some of the terms used herein were created to reflect the intentions of technicians in this art, precedents, or new technologies. Some of the terms used herein may also be have been arbitrarily chosen by the applicant. Accordingly, the specific terms used herein should be understood based on their unique meanings and in view of the entire context of the inventive concept.

As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, components, and/or groups thereof, but do not preclude the presence or addition of one or more other features, integers, steps, operations, elements, components, and/or groups thereof. Additionally, the term "and/or" includes any and all combinations of one or more of the associated listed items. Like reference numerals in the drawings denote like elements and thus their description will not be repeated herein Throughout the description, the term 'object' may be used to refer to all display components or displayed information that may be selected by a user input and controlled according to a user's intention. The object may include, for example, a first image, a second image included in the first image, a background image, an icon, a folder icon, an icon included in the folder icon, a text, a pop-up window, an application execution window, contents included in the application execution window, a list, an item included in the list, contents, and the like, but is not limited thereto.

The object may be displayed by a user input (such as a touch input) through a user input interface (such as a touch input side) set for the object. For example, the object may be hidden according to a function that is being performed in a device including a transparent display, activated according to the user input, and displayed.

Exemplary embodiments will now be described in detail with reference to the accompanying drawings.

FIG. 1 is a diagram illustrating objects and user input interface set for each of the objects, according to an exemplary embodiment.

Referring to FIG. 1, when a list is displayed, a scroll box, an item box, an icon included in the item box, etc. are objects. A user can input a command for the object by using the user input interface. FIG. 1 shows an example of a hierarchical relationship between objects. The scroll box is an object of the highest layer, and the icon is an object of the lowest layer. In other words, FIG. 1 shows an exemplary embodiment where a plurality of item box objects are included in a sub-layer of the scroll box object, and the icon object is included in a sub-layer of each of the item box objects.

A user input interface for each object may be preset as shown in FIG. 1. The user input interface of each object is set when a program to operate each object is produced. The user input interface for an object of a lower layer may also be set according to a user input interface that is set for an object of a higher layer.

For example, in a case where a user input interface of the icon of FIG. 1 is not set when the program including each object is produced, the user input unit of the icon may be set to a user input interface set for the item box because the item box is the parent layer of the icon and the icon is a sub-layer of the item box. The setting of the user input interface of the icon may be performed when the icon is displayed. In a case where the user input interfaces of the item box and the icon are not set when the program including each object is produced, the user input interfaces of the item box and the icon may be set according to a preset user input interface of the scroll box because the item box and the icon are sub-layers of the scroll box. In this case, when the item box and the icon are displayed, the user input interfaces of the item box and the icon may be set according to the user interface of the scroll box.

In a case where the user input interface of each object is set as shown in FIG. 1, the scroll box operates according to a user's input that is input through a back input interface, the item_box_1 operates according to a user's input that is input through a front input interface, the icon operates according to a user's input that is input through the front input interface and/or the back input interface, and the text operates according a user's input that is input through the front input interface.

Therefore, in a case where the user input interface of each object is set as shown in FIG. 1, an operation error in which an item box or an icon is mistakenly selected because they are located in a location where scrolling pauses does not occur because the scroll box is operated by entering input into the back input interface, the item box may only receive input through the front user interface, and the icon may only receive input through both the front user interface and the back input interface.

Additionally, the user input interfaces set for the objects in FIG. 1 may be determined based on at least one of an environment in which the objects are displayed and operations of the objects but the exemplary embodiments are not limited thereto.

For example, the front input interface that is easily controlled by the user may be set for an object having a narrow user input area (or touch area), and the back input interface that is not relatively easily controlled by the user may be set for an object having a wide user input area. The front input interface that is easily controlled by the user may be set for an object that performs an operation frequently used by the user, and the back input interface that is not relatively easily controlled by the user may be set for an object not frequently used by the user.

In a case where an object may be set to execute multiple operations according to a user input interface, a dual-sided input interface (i.e., a front input interface and a back input interface) may be set as the user input interface of the object An object based execution operation may be performed according to a user's input through the front input interface, the back input interface, and a the dual-sided input interface. The objects of FIG. 1 may be referred to as widgets. The front input interface, the back input interface, and dual-side input interface may be referred to as a front mode, a back mode, and a dual-side mode, respectively.

An input interface or an input mode mentioned throughout the specification may be a touch surface of a transparent display. Thus, the front input interface or a front input mode may be a front touch surface of the transparent display. The back input interface or a back input mode may be a back touch surface of the transparent display.

The user's input mentioned throughout the specification may be input information that is provided according to a user's gesture. The user gesture may be determined according to a position, direction, speed, number of touch points, etc. of the user's input. That is, when the input apparatus is based on a touch screen, the user's gesture may include, for example, a tap, a touch and hold, a double tap, a drag, panning, a flick, a drag and drop, a sweep, etc. but is not limited thereto.

A user's gesture on the touch screen may be made using a user's finger or a touch tool (e.g., a stylus pen). A user's gesture may also be received from a camera or other gesture detection device. In this case the user's gesture may include a gesture performed in space that is determined based on an image captured by using the camera. The gesture performed in space based on a motion a user may be determined by movements of a device (e.g., shaking, etc.).

When the input apparatus includes at least one of a physical button, a dial, a slider switch, a joystick, a click wheel, etc., the user's input may be dependent on a physical control by the user with respect to the input apparatus. When the input apparatus is an audio input based apparatus, the user's input may be dependent on voice recognition of the user based on a natural language (or a spoken language).

Figure 2A:
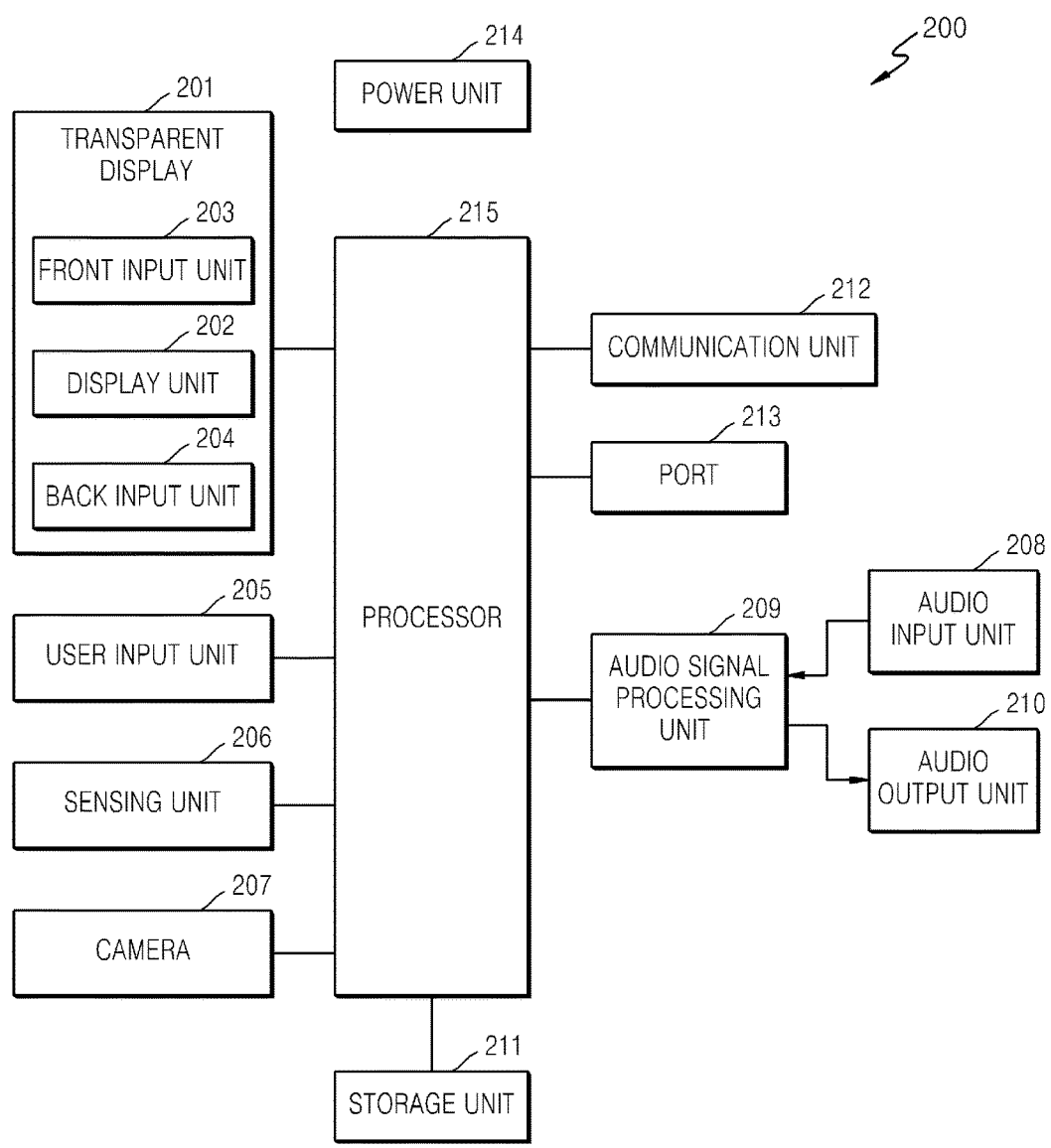
FIG. 2A is a block diagram of a device including a transparent display, according to an exemplary embodiment.

FIG. 2A is a block diagram of a device 200 including a transparent display 201, according to an exemplary embodiment. The device 200 including the transparent display 201 of FIG. 2 may be, for example, a smart phone, a notebook, a tablet, a tablet personal computer (PC), phablet, a mobile device, a handheld device or a handheld PC, a personal digital assistant (PDA), etc. but is not limited thereto. The transparent display 201 may also be applied to various fields such as high value added glass, glass for use as a functional vehicle part, a vehicle dashboard, a navigator, a security electronic device, a solar battery, a game machine, toys, a show window, smart window, etc.

Referring to FIG. 2A, the device 200 includes the transparent display 201, a user input unit 205, a sensing unit 206, a camera 207, an audio input unit 208, an audio signal processing unit 209, an audio output unit 210, a storage unit (storage) 211, a communication unit 212, a port 213, a power unit 214, and a processor 215. The structure of the device 200 including the transparent display 201 is not limited to that shown in FIG. 2.

The transparent display 201 may be referred to as a touch screen. The transparent display 201 includes a display unit 202 that displays objects, a front input unit 203 (e.g., a front input interface) that is installed in a front surface of the display unit 202 and receives a user's input based on a touch, and a back input unit 204 (e.g., a back input interface) that is installed in a back surface of the display unit 202 and also receives a user's input based on the touch. The front and back input interfaces may also receive other forms of the user's input based on imaging sensors, infrared sensors, proximity sensors, etc.

The display unit 202 outputs information including objects processed by the device 200. The information may include information other than the objects. The information other than the objects may be displayed and the information may be set so that it cannot be selected by the user's input.

The display unit 202 may be configured as a transparent device and may adjust transparency by adjusting light transmittance of the transparent device or by adjusting a Red, Green, Blue (RGB) value of each pixel. The display unit 202 may have a structure in which an organic light emitting diode (OLED) and a liquid crystal display (LCD) are coupled to each other. The OLED may be disposed adjacent to the front input unit 203. The LCD may be disposed adjacent to the back input unit 204. In a case where the display unit 202 has the above-described structure, the display unit 202 may normally maintain a transparent state like glass and, when power is supplied, may be set to be in an opaque state so that the LCD blocks out light.

The display unit 202 displays a screen in response to a user's gesture or a touch pattern that is input through the front input unit 203 and/or the back input unit 204, a user's input that is input through the user input unit 205, a user's input that is input through the sensing unit 206, a user's input that is input through the camera 207, or a user's input that is input through the audio input unit 208. The screen displayed on the display unit 202 includes a user interface (UI) or a graphical UI (GUI).

The display unit 202 maybe embodied as one or more of an LCD, a thin film transistor liquid crystal display (TFT-LCD), an OLED, a flexible display, a 3D display, or an active matrix OLED (AM OLED), a volumetric display, a holographic display, etc., but is not limited thereto. The number of transparent displays 201 may be two or more according to an implementation of the device 200.

The front input unit 203 and the back input unit 204 include touch sensors for receiving the touch based input of a user. Alternatively, there may more than two touch sensors or other types of sensors for receiving the input of a user. The sensors may be used to provide an unlimited number of input interfaces that are used to perform different functions according to separate user inputs into each input interface or combine simultaneous user input into multiple input interfaces.

According to an exemplary embodiment, the sensor for sensing touches to the front input unit 203 and the back input unit 204 includes a sensor for detecting a user's gestures or patterns in the front input unit 203 and the back input unit 204. The sensor for sensing the touches may generate a sensing signal when one or more of a drag, a flick, a tap, a touch and hold, a double tap, a sweep, etc., is sensed in the front input unit 203 and/or the back input unit 204. A tactile sensor may be used as an example of the sensor for detecting touches of the front input unit 203 and the back input unit 204. The tactile sensor may sense various types of information such as roughness of a touch surface, hardness of a touch object, a temperature of a touch point, etc.

The front input unit 203 and the back input unit 204 may be configured to a decompression input unit (resistive) or a static input unit (capacitive). User input recognition in the front input unit 203 and the back input unit 204 can use coordinate information. An x axis coordinate and a y axis coordinate corresponding to a position at which a touch occurs can be recognized as the user's input.

The user's input may take place according to a user's request or a user's selection based on a user's gesture. The user's gesture may be determined in various ways for example, according to various combinations of touch frequency, touch patterns, touch area, and touch intensity. The user's input may be input by the user's finger or a touch tool such as the stylus pen. The user's finger or the touch tool may be referred to as an external input apparatus.

Touches of the front input unit 203 and the back input unit 204 indicate a case where a pointer touches a touch panel. Touch inputs may include multiple touches or touch points. Proximity touches of the front input unit 203 and the back input unit 204 indicate a case where the pointer does not actually touch the front input unit 203 or the back input unit 204 but is determined to be within a predetermined distance of the front input unit 203 and the back input unit 204.

The pointer is a tool used to touch or proximity touch specific portions of the front input unit 203 and the back input unit 204. The stylus pen or the user's finger can be used as the pointer.

The transparent display 201 may be implemented in various forms such as a transparent LCD, a transparent thin film electroluminescent (TFEL) panel, a transparent OLED, a projective display, etc. Different embodiments of the structure of the transparent display 201 will now be described.

The transparent LCD is a transparent display apparatus implemented by using a pair of polarizing plates, an optical film, a transparent thin film transistor (TFT), a transparent electrode, etc. while removing a backlight unit of a currently used LCD apparatus.

The transparent TFEL panel is an alternating current inorganic TFEL (AC-TFEL) display apparatus including a transparent electrode, an inorganic phosphor, and an insulation film. The AC-TFEL display apparatus is a display that emits light by exciting a phosphor using electrons accelerated in the inorganic phosphor. In a case where the transparent display 201 is implemented as the transparent TFEL panel, the processor 215 may determine an information display location by adjusting electrons to be projected to an appropriate location. The inorganic phosphor and the insulation film have a transparent characteristic, and thus a very transparent display may be implemented.

The transparent OLED is a transparent display apparatus that uses a self light emitting OLED. Since an organic light emitting layer is transparent, if both electrodes are used as transparent electrodes, the transparent OLED may be implemented as the transparent display apparatus. The OLED emits light by injecting electrons and holes from both sides of the organic light emitting layer and coupling them in the organic light emitting layer. The transparent OLED apparatus uses such a principle to inject electrons and holes at a desired location and display information.

Figure 2B:
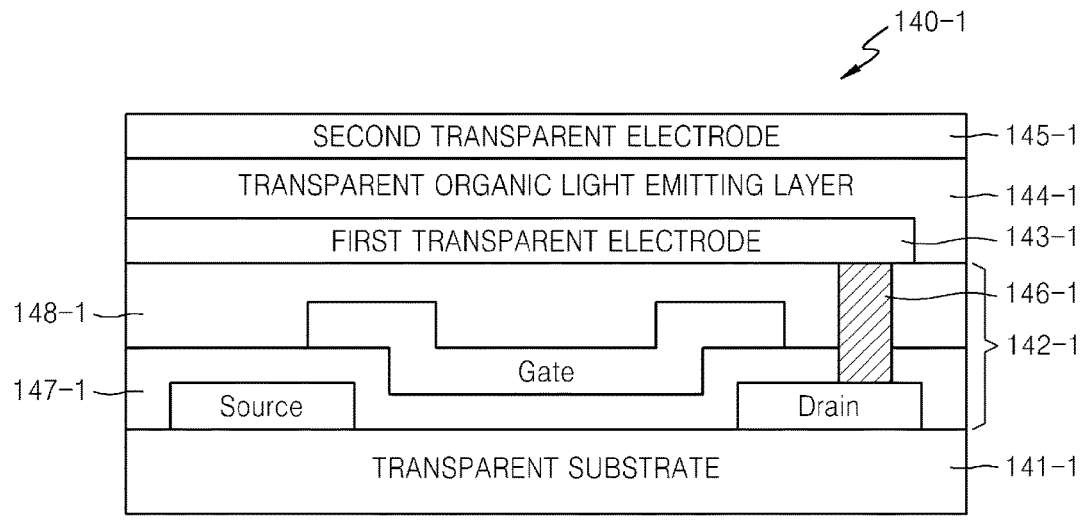
FIG. 2B is a cross-sectional view of a detailed structure of a transparent display of FIG. 2A.

FIG. 2B is a cross-sectional view of a detailed structure of a transparent display 140-1 implemented as a transparent OLED.

Referring to FIG. 2B, the transparent display 140-1 includes a transparent substrate 141-1, a transparent transistor layer 142-1, a first transparent electrode 143-1, a transparent organic light emitting layer 144-1, a second transparent electrode 145-1, and a connection electrode 146-1.

The transparent substrate 141-1 may use a polymer material like plastic or glass having a transparent property. The material of the transparent substrate 141-1 may be determined according to an environment in which a transparent display apparatus 100 is to be used. For example, the polymer material that is advantageously light and flexible may be used by a mobile display apparatus, and glass may be used in a showcase window of a store or a general window. The transparent transistor layer 142-1 is a layer including a transistor produced by replacing opaque silicon of a given TFT with a transparent material such as transparent zinc oxide, titanium oxide, etc. The transparent transistor layer 142-1 may include a source, a gate, a drain, and various dielectric films 147-1 and 148-1, and a connection electrode 146-1 that electrically connects the drain and the first transparent electrode 143-1. Although the transparent transistor layer 142-1 includes a single transparent transistor including the source, the gate, and the drain in FIG. 2B, the transparent transistor layer 142-1 may also include a plurality of transparent transistors that are uniformly distributed in an entire region of a display surface. The processor 215 may apply a control signal to a gate of each transistor included in the transparent transistor layer 142-1 to drive a corresponding transparent transistor and display information.

The first transparent electrode 143-1 and the second transparent electrode 145-1 are disposed in opposite directions with respect to the transparent organic light emitting layer 144-1. The first transparent electrode 143-1, the transparent organic light emitting layer 144-1, and the second transparent electrode 145-1 form a transparent OLED.

The transparent OLED may be classified into a passive matrix OLED (PMOLED) and an active matrix OLED (AMOLED) according to a method of driving display. The PMOLED has a structure in which a pixel is formed at a part where the first transparent electrode 143-1 and the second transparent electrode 145-1 cross each other, whereas the AMOLED has a structure having a TFT for driving each pixel. FIG. 2B shows the AMOLED.

Each of the first transparent electrode 143-1 and the second transparent electrode 145-1 includes a plurality of line electrodes. The line electrodes are arranged perpendicularly to each other. If the line electrodes of the first transparent electrode 143-1 are arranged in a horizontal direction, the line electrodes of the second transparent electrode 145-1 are arranged in a vertical direction. Accordingly, a plurality of crossing regions are formed between the first transparent electrode 143-1 and the second transparent electrode 145-1. A transparent transistor is connected to each of crossing regions as shown in FIG. 2B.

The processor 215 uses the transparent transistor to form an electric potential for each crossing region. Light is emitted in the crossing region where the electric potential is generated by injecting electrons and holes into the transparent organic light emitting layer 144-1 from each electrode and coupling them to each other. Light is not emitted in the crossing region where the electric potential is not generated, and accordingly, a background is transparent as it is.

Indium tin oxide (ITO) may be used as the first transparent electrode 143-1 and the second transparent electrode 145-1. Alternatively, a new material such as graphene may be used. Graphene is a substance having a planar structure with a honeycomb lattice made of carbon atoms and has a transparent property. In addition, the transparent organic light emitting layer 144-1 may be formed of various materials.

The above-described transparent display 201 may be implemented as a projective display in addition to the transparent LCD, the transparent TFEL panel, and the transparent OLED. The projective display projects and displays an image on a transparent screen like a head up display (HUD).

The user input unit 205 generates input data (or control data) and a user input for controlling an operation of the device 200. The user input unit 205 may include a key pad, a dome switch, a touch pad, a mouse, a job wheel, a jog switch, a hardware button, etc.

The sensing unit 206 senses a current status of the device 200 such as a location of the device 200, whether a user's touch occurs, an orientation of the device 200, an acceleration or a deceleration of the device 200, etc. and generates a sensing signal for controlling an operation of the device 200.

The sensing unit 206 includes a sensor other than sensors for sensing touches of the front input unit 203 and the back input unit 204. For example, the sensing unit 206 may include a proximity sensor. The proximity sensor is a sensor for detecting whether an external object approaches a predetermined detection surface (e.g., front input interface, back input interface, etc.) or whether the external object is present near detection surface by using a force of an electromagnetic field or an infrared ray without requiring an actual physical touch. The external object is an object located on the outside of the device 200. Examples of the proximity sensor include a transparent photoelectric sensor, a direct reflective photoelectric sensor, a mirror reflective photoelectric sensor, a high frequency oscillation photoelectric sensor, a capacitive photoelectric sensor, a magnetic photoelectric sensor, an infrared photoelectric sensor, etc.

The camera 207 processes an image frame such as a still image or a moving image obtained from an image sensor in a conference call mode or a photographing mode. The processed image frame may be displayed on the display unit 202. The image frame processed by the camera 207 may be stored in the storage unit 211 or may be transmitted to an external device through the communication unit 212 or the port 213.

The camera 207 may also be configured to move a photographing angle of a lens in a left or a right direction according to a user's gesture corresponding to a drag through the back input unit 204. The number of cameras 207 may be two or more depending on a structure of the device 200. The camera 207 may be used as an input apparatus that recognizes a user's spatial gesture.

The audio input unit 208 receives an input of an external sound signal in a call mode, a recording mode, or a voice recognition mode, etc. The audio input unit 208 may be configured as, for example, a microphone. The audio input unit 208 may be configured to include various noise removal algorithms for removing noise that occurs during the process of receiving the input of the external sound signal.

The sound signal input by using the audio input unit 208 may be a user's voice input that is used to control objects displayed on the transparent display 201 according to an exemplary embodiment. That is, the sound signal input by using the audio input unit 208 may include voice recognition based user input information based on the natural language or spoken language of the user. The sound signal input by using the audio input unit 208 may be stored in the storage unit 211 or may be transmitted to an external device through the communication unit 212 or the port 213.

The audio signal processing unit 209 provides an interface between the audio input unit 208 and the processor 215 and between the audio output unit 210 and the processor 215. For example, the audio signal processing unit 209 converts the sound signal received from the audio input unit 208 into audio data that may be processed by the processor 215 and transmits the audio data to the processor 215. The audio signal processing unit 209 may also convert the audio data transmitted from the processor 215 into an electrical sound signal and transmits the electrical sound signal to the audio output unit 210.

The audio output unit 210 outputs the sound signal or the audio signal received from the audio signal processing unit 209 in the call mode or an audio production mode. The audio output unit 210 may be configured as a speaker. The audio input unit 208 and the audio output unit 210 may be integrally configured into a head set.

The transparent display 201, the user input unit 205, the sensing unit 206, the camera 207, and the audio input unit 208 may be referred to as input apparatuses or input/output apparatuses according to a function of a user interface between the device 200 and the user. For example, in a case where the function of the user interface between the device 200 and the user includes a touch screen function, a sound recognition function, and a spatial gesture recognition function, the user input unit 205, the sensing unit 206, the camera 207, and the audio input unit 208 may be referred to as the input apparatuses, and the transparent display 201 may be referred to as the input/output apparatus.

The storage unit 211 stores at least one program configured to be executed by the processor 215, and a resource. The at least one program includes a program that executes an object control method or a guide display method according to an exemplary embodiment, an operating system program of the device 200, and programs necessary for executing an application set in the device 200 and various functions (for example, a communication function and a display function) of the device 200. The resource includes information necessary for executing the above-described programs, user interface screen information for controlling objects mentioned in exemplary embodiments, and object control function information corresponding to the user's input. The user interface screen information for controlling objects may include, for example, an edit window with respect to an input interface of each object. The resource also includes information regarding a predetermined input interface that is set for each object.

The program, which executes the object control method or the guide display method, stored in the storage unit 211 may be configured to be included in an application program including the objects. The program that executes the guide display method may be configured as a program independent from the application program. That is, the program that executes the guide display method may be executed when an operating mode of the device 200 is set to execute the guide display method or may be executed by default when the device 200 is powered on irrespective of an application that is executed. For example, the program to execute the guide display method may be part of the operating system of the device 200.

According to various exemplary embodiments described hereinafter, a program may be executed after an arbitrary application is executed, and may not be executed if the execution of the arbitrary application is complete. For example, a program that executes a method of controlling objects included in the phone book application or a program that executes the guide display method may be executed as part of a phone book application, and, if the execution of the phone book application is complete, the operation of the program that executes the method of controlling objects included in the phone book application or the program that executes the guide display method may be terminated. Alternatively, the guide display method may be executed irrespective of whether the phone book application is executed.

The storage unit 211 may be configured to independently include a storage unit that stores at least one program necessary for performing various functions of the device 200 and an operating system program of the device 200, and a storage unit that stores one or more programs that execute the object control method or the guide display method according to the various exemplary embodiments.

The storage unit 211 may include a high speed random access memory, a magnetic disk storage apparatus, a non-volatile memory such as a flash memory or another non-volatile semiconductor memory. Thus, the storage unit 211 may be referred to as a memory.

The communication unit 212 may be configured to transmit and receive data with an external electronic device (not shown) and a server (not shown) over a wireless network such as wireless Internet, wireless Intranet, a wireless phone network, a wireless local area network (LAN), a Wi-Fi network, a Wi-Fi direct (WFD) network, a 3G network, a 4G Long Term Evolution (LTE) network, a Bluetooth network, an infrared data association (IrDA) network, a radio frequency identification (RFID) network, a ultra wideband (UWB) network, a Zigbee network, or a near field communication (NFC) network.

The communication unit 212 may include at least one of a broadcasting reception module, a mobile communication module, a wireless Internet module, a wired Internet module, a short distance communication module, and a location information module but is not limited thereto.

The broadcasting reception module receives a broadcasting signal and/or broadcasting related information from an external broadcasting management server through a broadcasting channel. The broadcasting channel may include a satellite channel and a terrestrial channel. The mobile communication module transmits and receives a wireless signal to and from at least one of a base station, the external electronic device (not shown), and the server (not shown) over a mobile communication network. The wireless signal may include various types of data according to a voice call signal, a conference phone call, or transmission/reception of a text/multimedia message. The wireless Internet module is a module for communicating through a wireless Internet connection. The wired Internet module is a module for a wired Internet connection.

The short distance communication module is a module for short distance communication. Short distance communication technologies may use Bluetooth, RFID, IrDA, UWB, Zigbee, WFD, NFC, etc. The location information module is a module for confirming or obtaining the location of the device 200. An example of the location information module is a global positioning system (GPS) module. The GPS module receives location information from a plurality of artificial satellites. The location information may include coordinate information including latitude and longitude.

The port 213 may transmit and receive data to and from an external device (not shown) by using a plug and play interface such as a universal serial bus (USB) port (not shown). The plug and play interface is a module that automatically plays if the external device is plugged into the device 200.

The power unit 214 supplies power to various elements of the device 200. The power unit 214 includes one or more power sources such as a battery and an alternating current (AC) power source. The device 20 may not include the power unit 214 but may include a connection unit (not shown) that may be connected to an external power supply unit (not shown).

The processor 215 may include one or more processors that control a general operation of the device 200. For example, the processor 215 may be divided into a plurality of processors according to a function of the device 200.

The processor 215 may generally control the transparent display 201, the user input unit 205, the sensing unit 206, the camera 207, the audio input unit 208, the audio signal processing unit 209, the audio output unit 210, the storage unit 211, the communication unit 212, and the port 213. Thus, the processor 215 may be referred to as a controller, a microprocessor, a digital signal processor, etc. The processor 215 may also provide user's input information input through the transparent display 201, the user input unit 205, the sensing unit 206, the camera 207, and the audio input unit 208 that correspond to input apparatuses and a user interface based on the transparent display 201.

The processor 215 may execute at least one program related to the object control method or the guide display method according to exemplary embodiments. The processor 215 may execute the program by reading the program from the storage unit 211 or downloading the program from an external apparatus such as an application providing server (not shown) or a market server (not shown) through the communication unit 212. The program related to the object control method may be included in a program for each application as described above.

The processor 215 may include an interface function unit interfacing between various functional modules and the processor 215 of the device 200. The operation of the processor 215 related to the object control method or the guide display method according to exemplary embodiments may be performed as shown in flowcharts of FIGS. 3, 21, and 23, which will be described later.

Figure 3:
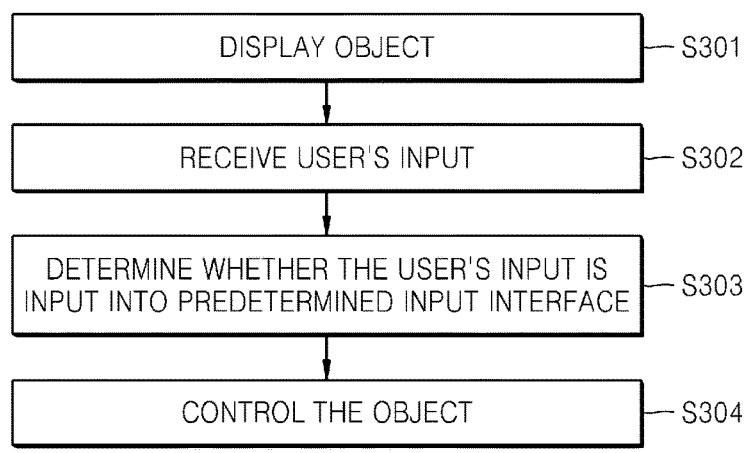
FIG. 3 is a flowchart of an object control method performed by a device including a transparent display according to an exemplary embodiment.

FIG. 3 is a flowchart of an object control method performed by the device 200, according to an exemplary embodiment. The object control method of FIG. 3 may be performed by the processor 215 of FIG. 2.

The processor 215 displays at least one object according to an execution of an application or an operation of the device 200 (operation S301).

The processor 215 receives a user's input through at least one of the front input unit 203 and the back input unit 204 with respect to the displayed at least one object (operation S302).

The processor 215 determines whether the received user input is input into a predetermined input interface with respect to the displayed at least one object (operation S303). According to an exemplary embodiment, the processor 215 detects whether the user input is received through the front input interface, the back input interface, and both the front input interface and the back input interface. The processor 215 then compares the predetermined input interface of the object with the detected input interface from the user input.

The predetermined input interface may be predetermined for each object as described with reference to FIG. 1 or may be set when an object is displayed according to a predetermined input interface of an object of a higher layer (or a parent layer). The predetermined input interface with respect to the displayed object may be mapped when the object is displayed.

The processor 215 controls the object based on a result of the determination of operation S303 (operation S304). According to an exemplary embodiment, the processor 215 may perform a function corresponding to the predetermined input interface that matches the detected input interface based on the comparison between the predetermined input interface of the object with the detected input interface from the user input.

Figure 4:
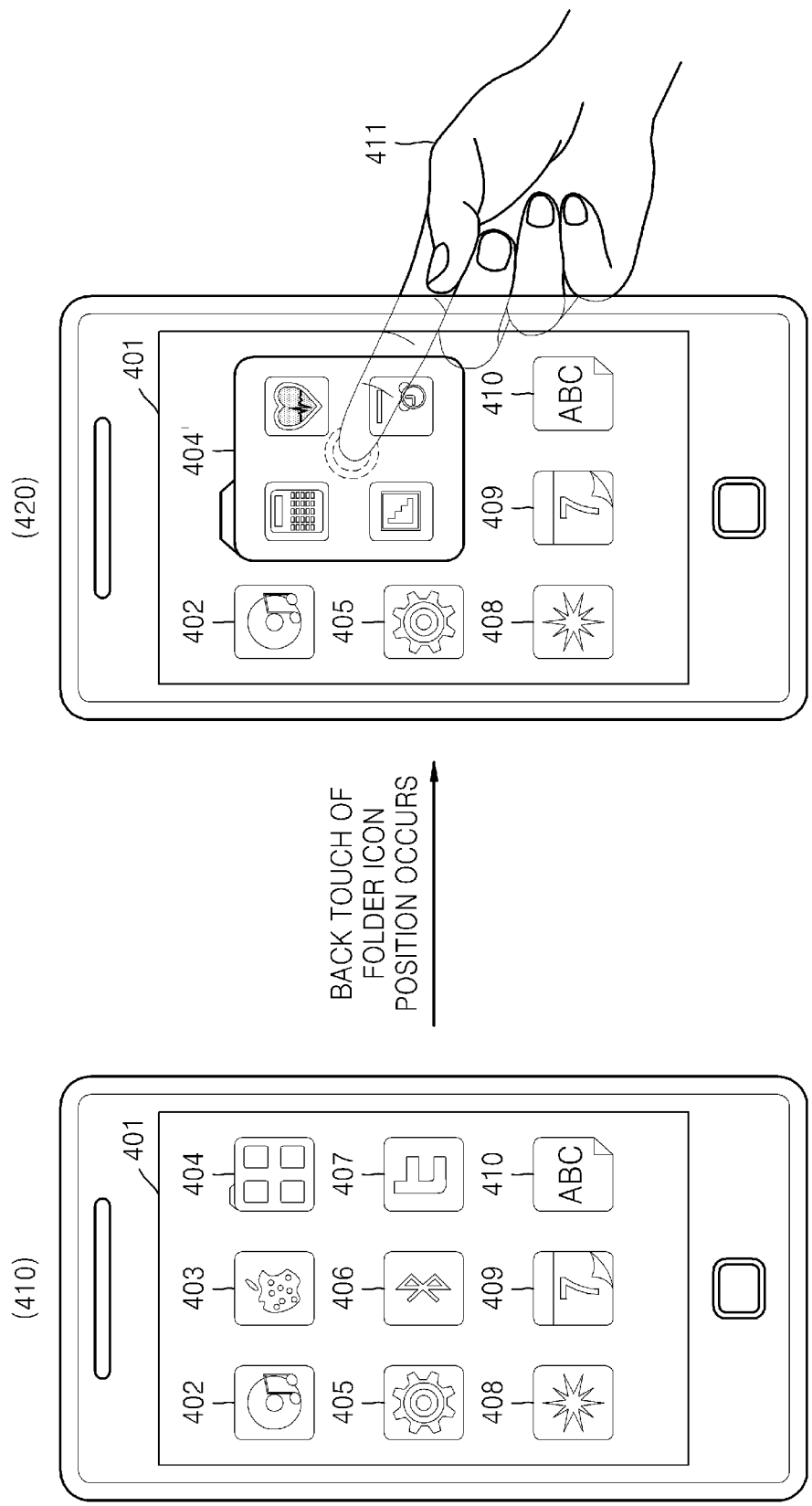
FIGS. 4 through 20 illustrate examples of screens displayed during the object control method of FIG. 3.

FIG. 4 shows an example screen of an object control process of FIG. 3. Referring to FIG. 4, when a screen 410 is displayed on the transparent display 201, the screen 410 is changed to a screen 420 as a touch position of the back input unit 204 corresponding to a folder icon 404 is pressed for a predetermined period of time longer than the time necessary to detect a touch of the transparent display 201 (i.e., a touch and hold gesture). That is, the folder icon 404 of the screen 410 is changed to a folder icon 404' of the screen 420 that expands in a direction of the front input unit 203. If the touch position that is being pressed is released, the screen 420 having the expanded folder icon 404' returns to the screen 410. The screens 410 and 420 of FIG. 4 show that, when a plurality of objects 402-410 are displayed in operation S301 of FIG. 3, in operation S304, a display status of a second object (the folder icon 404) displayed on the front of a first object 401 (a window) of which the predetermined input interface is the back input unit 204 that is changed according to a user's input 411 with respect to the first object 401.

In this regard, if the predetermined input interface with respect to the folder icon 404 corresponding to the second object is the front input unit 203, a user may control executions of icons included in the expanded folder icon 404' based on the a user input through the front input unit 203.

Figure 5:
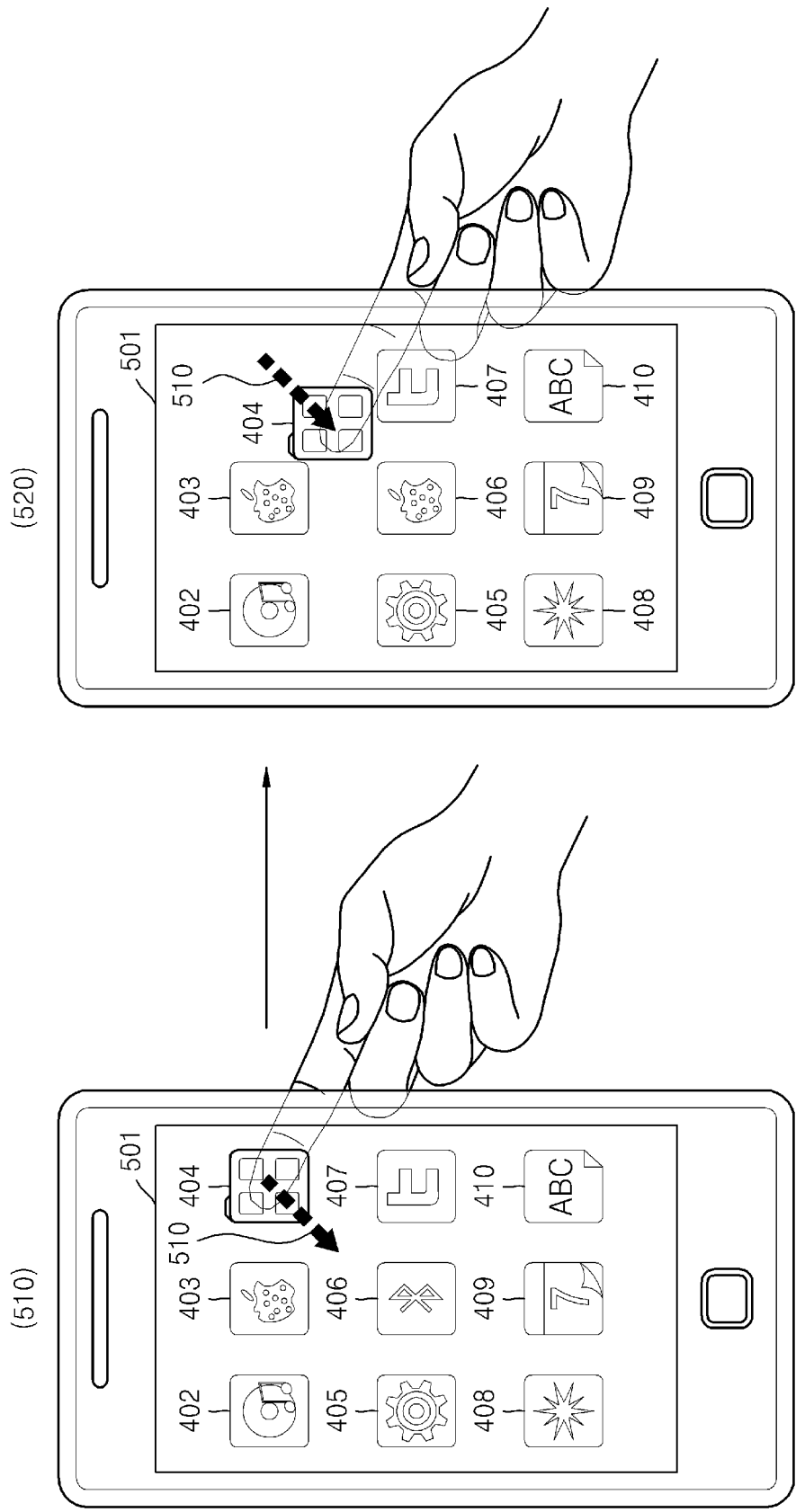

FIG. 5 shows another example screen of the object control process of FIG. 3. This screen example shows a case where the folder icon 404 is moved to a position of a screen 520 by touching a touch position of the back input unit 204 corresponding to the folder icon 404 (404 not shown in FIG. 5) on a window 501 (a first object) of which the predetermined input interface is the back input unit 204 and then dragging the touch position in a direction 502. Thus, when the folder icon 404 is moved, the folder icon 404, the neighboring folder icon 407 and the entire window 501 is no long obscured due to a user's hand because the hand is performing the gesture from behind the transparent display 201. In addition, the icons on the screen 520 may be automatically rearranged due to the movement of the folder icon 404.

As described with reference to FIG. 4, the screens 510 and 520 of FIG. 5 show that a display status of the second object 404 displayed on the front of the first object 501 of which the predetermined input interface is the back input unit 204 is changed according to a user's input with respect to the first object 501.

Figure 6:
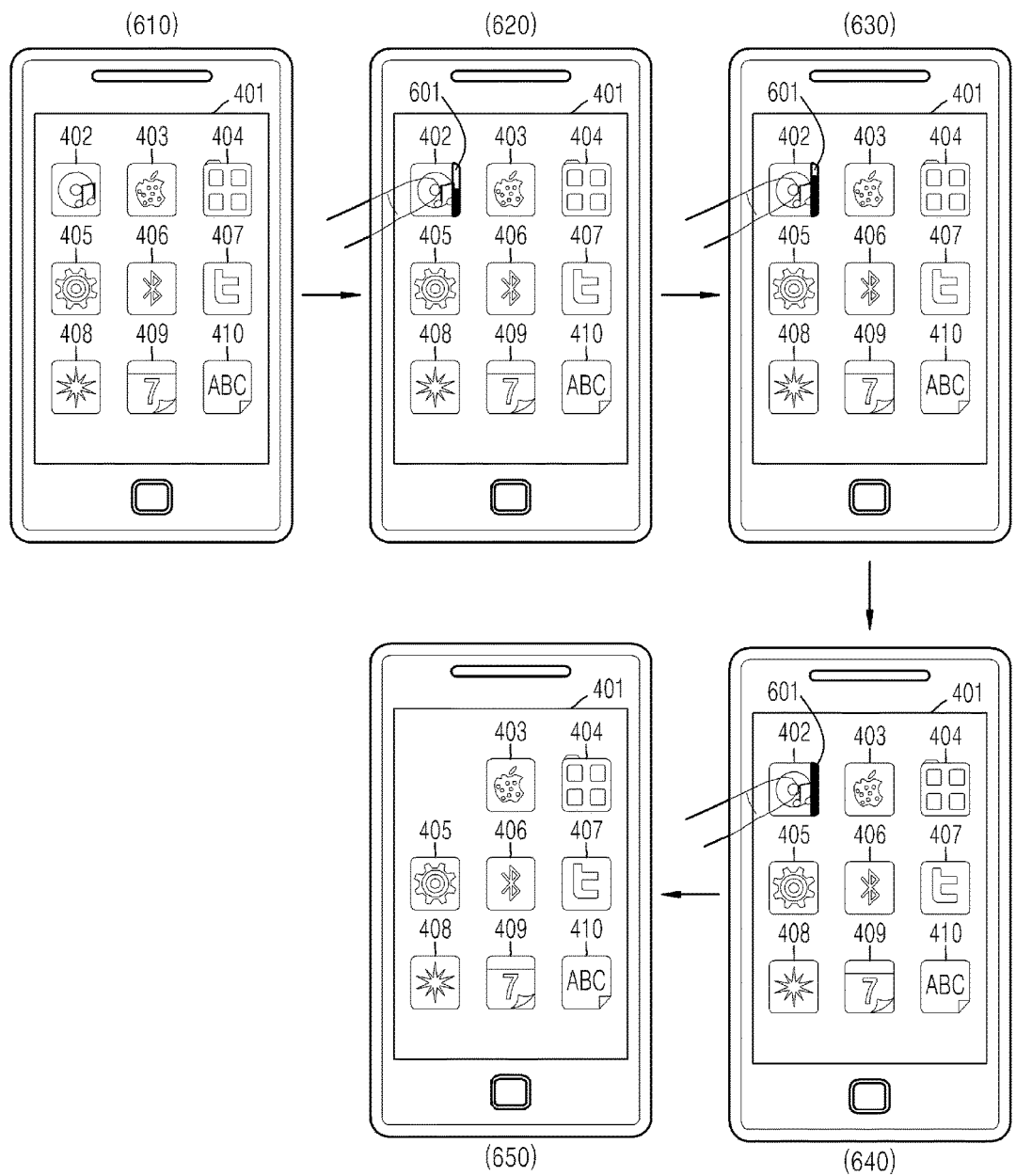

FIG. 6 shows another example of a screen of the object control process of FIG. 3. When a touch position of the back input unit 204 corresponding to an icon 402 is touched on the window 401 of which the predetermined input interface is the back input unit 204, a progress bar 601 indicating a touch time or touch intensity (e.g., touch pressure) is displayed on a screen 620. As the touch time remains or the touch intensity increases, the screen 620 is changed to a screen 630, and the screen 630 is changed to a screen 640. As shown in the screen 640, when the progress bar 601 is completely full, the icon 402 may be deleted as shown in a screen 650.

As described with reference to FIG. 4, the screens 610 through 650 of FIG. 6 show that a display status of the second object 402 displayed on the front of the first object 401 is changed (deleted) according to a user's input with respect to the first object 401. That is, the second object 402, for which the back input unit 204 is set as a predetermined input interface, is deleted according to an input through the back input unit 204.

Figure 7:
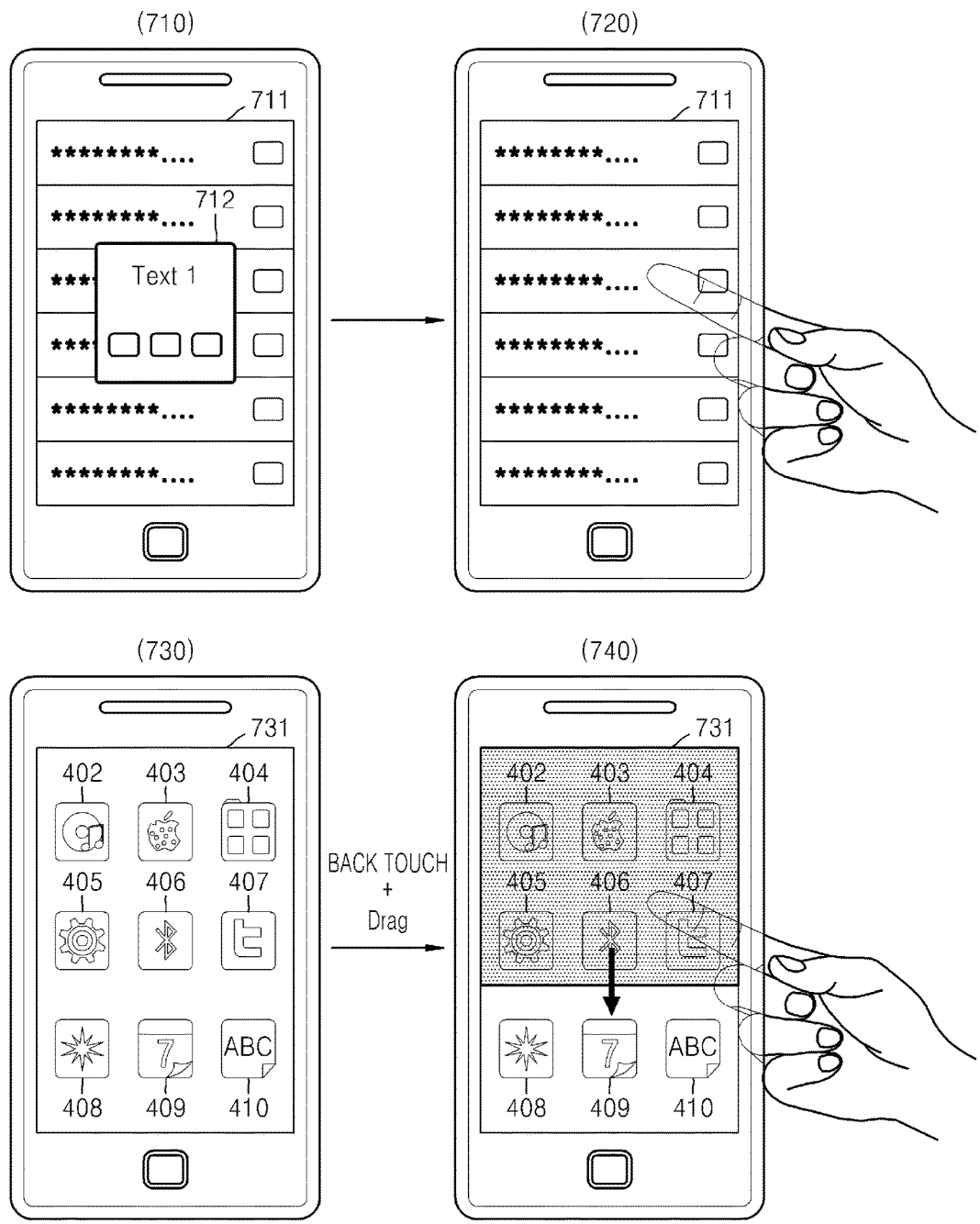

FIG. 7 shows another example screen of the object control process of FIG. 3.

Screens 710 and 720 of FIG. 7 show the moving of a window 711 of from a lower layer to a higher layer. According to a user's input that is input through the back input unit 204, the window 712 is moved to a lower layer when a plurality of windows 711 and 712 overlap each other. Thus, the window 712 is hidden by being displayed on the lower layer of the window 711 on the screen 720.

A predetermined input interface of the window 711 of the lower layer is the front input unit 203, and a predetermined input interface of a background layer (not shown) of the window 711 of the lower layer is the back input unit 204, and the window 711 of the lower layer may be moved and displayed on the higher layer by a user's gesture with respect to the back input unit 204 of the background layer (not shown).

Screens 730 and 740 of FIG. 7 show a change from a transparent status to an opaque status according to a user's input that is input through the back input unit 204. That is, when the screen 730 is displayed and the back input unit 204 is a predetermined input interface of a first object 731, an upper end of the screen 740 is changed from the transparent status to the opaque status by performing a dragging gesture as a user input from an upper end to a lower end through the back input unit 204.

The screens 730 and 740 of FIG. 7 show that a status of the display unit 202 is changed according to a user's input with respect to the first object 731 for which the back input unit 204 is a predetermined input interface.

Figure 8:
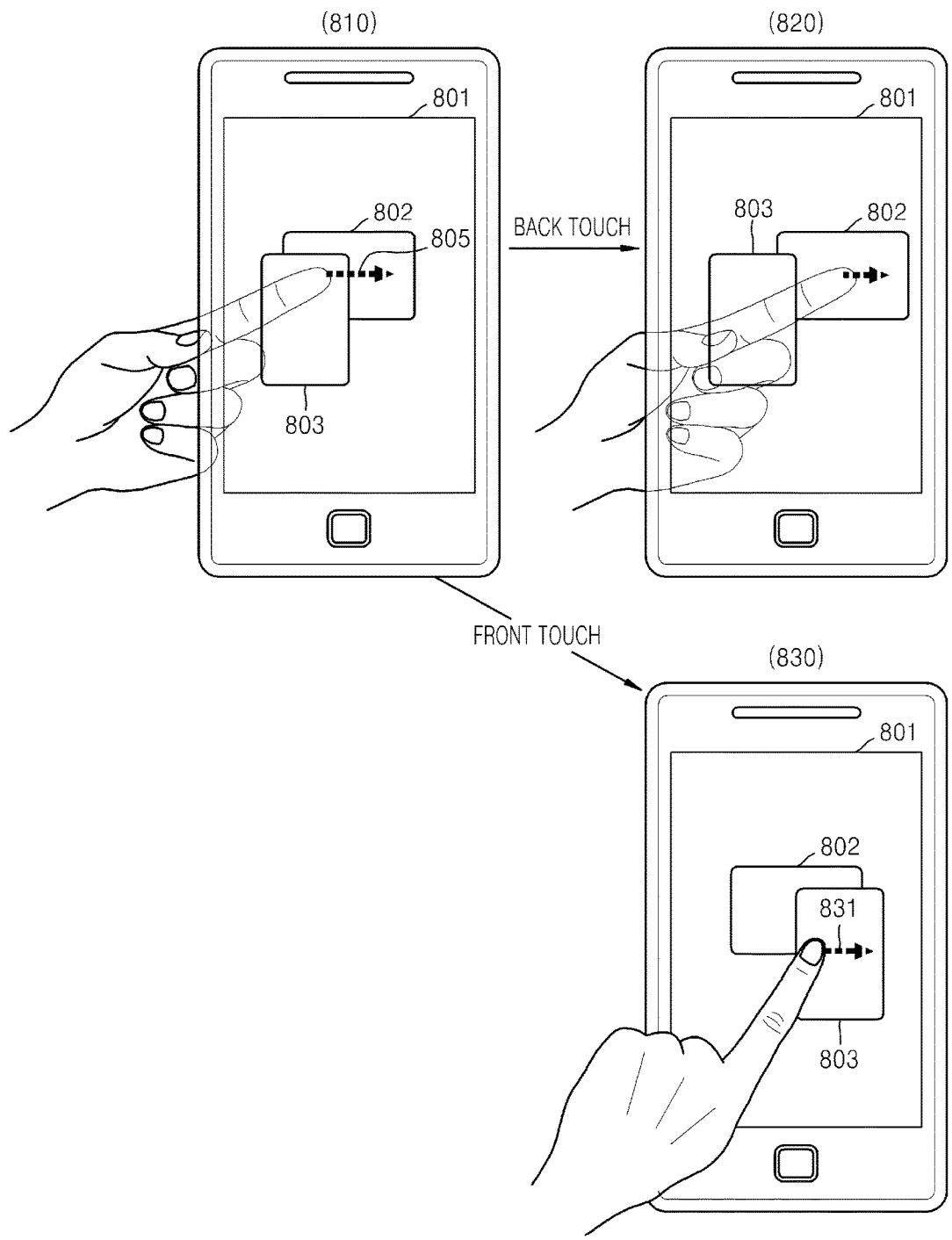

FIG. 8 shows another example screen of the object control process of FIG. 3.

FIG. 8 shows that a plurality of objects overlap each other and are displayed, a predetermined input interface of a back object 802 is the back input unit 204, and a predetermined input interface of a front object 803 is the front input unit 203.

Therefore, the back object 802 of a screen 810 is moved as shown on a screen 820 by touching a touch position of the back input unit 204 corresponding to the back object 802 and dragging the touch position in a direction 805.

The front object 803 of the screen 810 is moved as shown on a screen 830 by touching a touch position of the front input unit 203 corresponding to the front object 803 and dragging the touch position in a direction 831.

The front input unit 203 is set as a predetermined input interface for the back and front objects 802 and 803, and the back object 802 may be moved according to a user's input with respect to the back input unit 204 that is a predetermined input interface for a background object 801. In this case, as described with reference to FIG. 4, the screens 810 and 820 of FIG. 8 show that a display status of the second object, i.e., the back object 802, displayed on the front of the first object, i.e., the background object 801, for which the back input unit 204 is a predetermined input interface is changed according to a user's input with respect to the first object 801.

Figure 9:
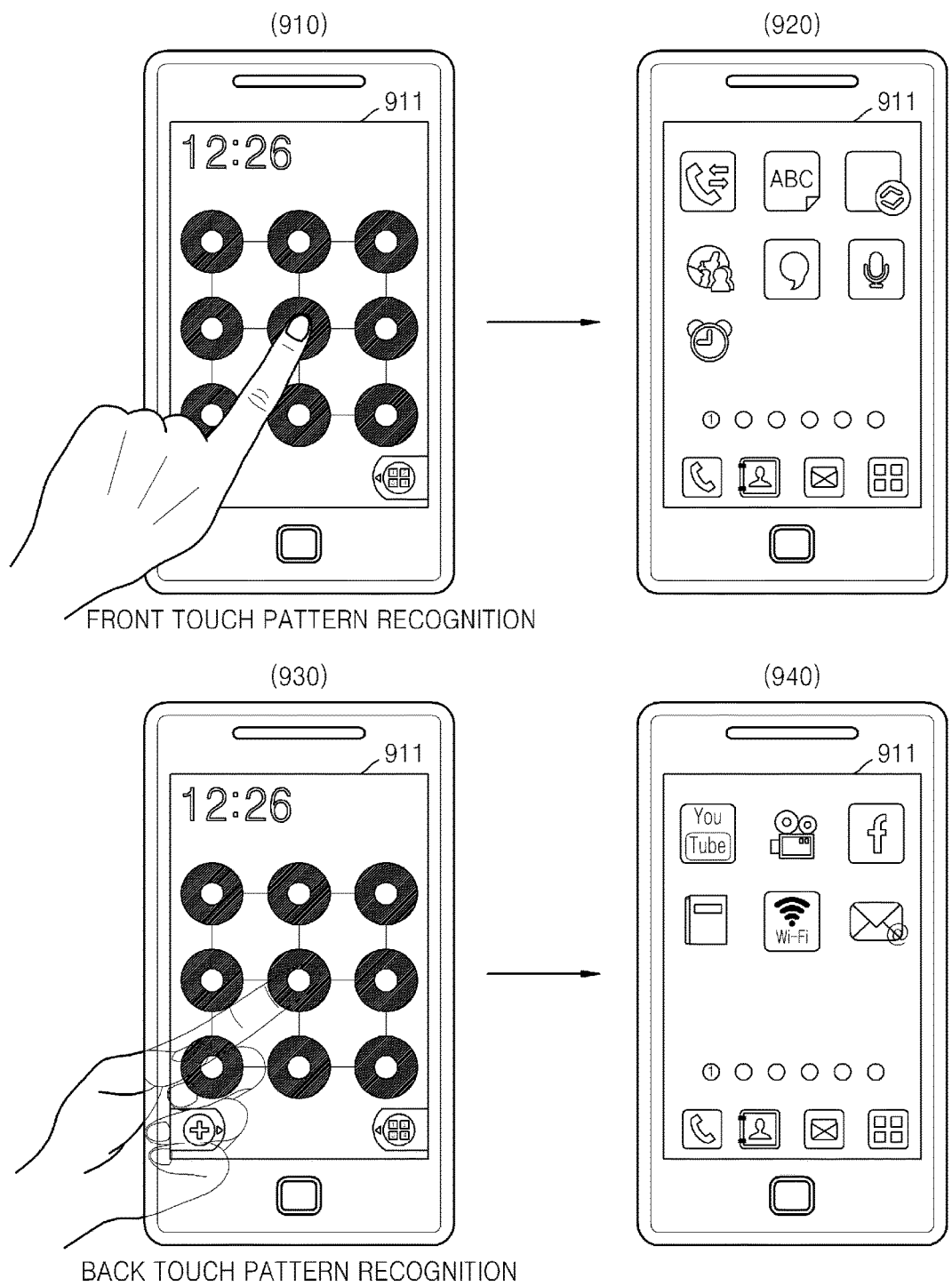

FIG. 9 shows another example screen of the object control process of FIG. 3.

FIG. 9 shows an example of a locked screen of a device. That is, different home screens (or menu screens) may be displayed when screens are unlocked according to a user's input with respect to the front input unit 203 and according to a user's input with respect to the back input unit 204.

Screens 910 and 920 are unlocked according to the user's input with respect to the front input unit 203. Screens 930 and 940 are unlocked according to the user's input with respect to the back input unit 204.

FIG. 9 may be applied when a front unlock user and a back unlock user are different from each other.

The front and back input units 203 and 204 are predetermined user input interfaces of an object 911 (a screen for performing an unlock function), the screens 910 and 920 perform a first function predetermined for the object 911 in response to the user input that is input through the front input unit 203, and the screens 930 and 940 perform a second function predetermined for the object 911 in response to the user input that is input through the back input unit 204.

Figure 10:
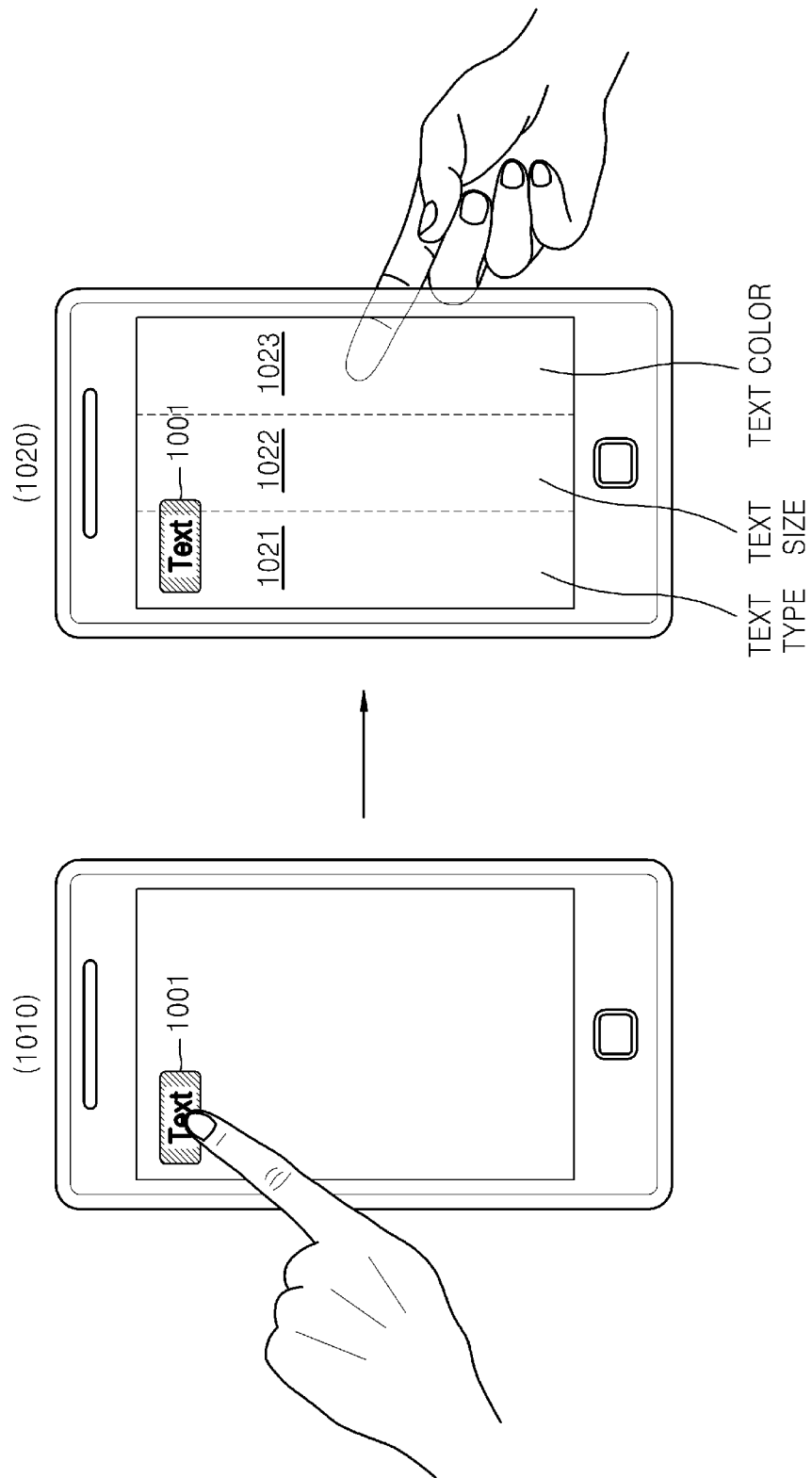

FIG. 10 shows another example screen of the object control process of FIG. 3. In FIG. 10, text 1001 is selected through the front input unit 203 so that the back input unit 204 is divided into three regions 1021, 1022, and 1023 to set a type, a size, and a color of the selected text 1001 as shown in a screen 1020. The text type, the text size, and the text color that may be selected by performing a gesture such as a scrolling gesture based on a back touch on each of the regions 1021, 1022, and 1023 that are reflected on the selected text 1001 and displayed on the screen 1020.

As described with reference to FIG. 10, the screens 1010 and 1020 of FIG. 10 show that the front and back input units 203 and 204 are predetermined user input interfaces of an object 1001, a first function (for example, the function for dividing into the tree regions, as mentioned above) for the object 1001 is performed in response to a user's input that is input through the front input unit 203 of the screen 1010, and a second function (for example, a text type setting, a text size setting, and a text color setting) for the object 1001 is performed in response to the user's input that is input through the back input unit 204 of the screen 1020.

Figure 11:
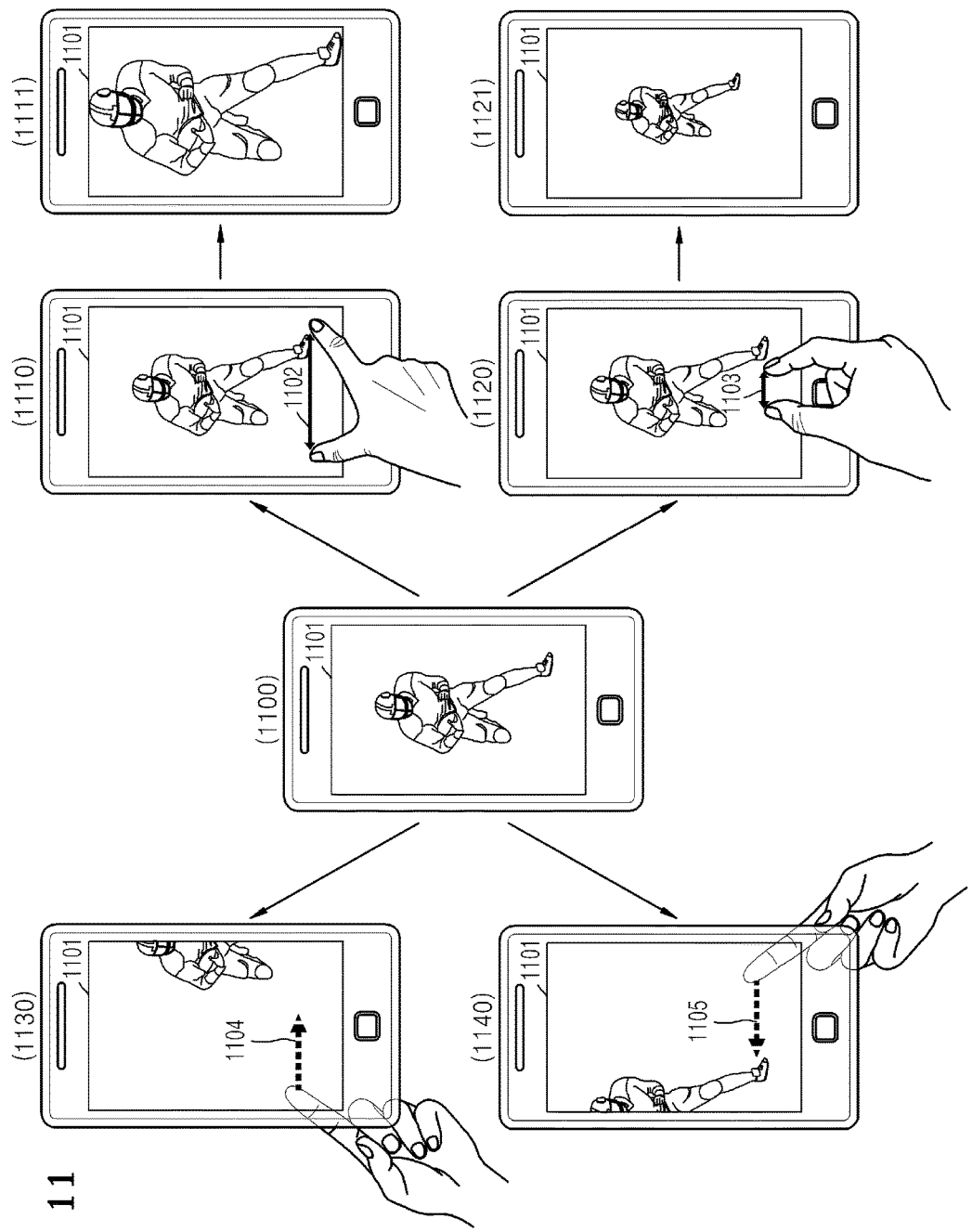

FIG. 11 shows another example screen of the object control process of FIG. 3.

Referring to FIG. 11, a picture object 1101 is photographed with the camera 207, a screen 1110 is enlarged to a screen 1111 by performing a zoom-in gesture 1102 with respect to the front input unit 203 of an object 1101 of screen 1110 and is reduced to a screen 1121 by performing a zoom-out gesture 1103 with respect to the front input unit 203 of screen 1120.

Also, a photographing angle of a lens of the camera 207 is adjusted by touching a touch position the back input unit 204 of the object 1101 and dragging the touch position in a direction 1104, and thus the screen 1100 is changed to a screen 1130. The photographing angle of the lens of the camera 207 is adjusted by touching a touch position the back input unit 204 of the object 1101 and dragging the touch position in a direction 1105, and thus the screen 1100 is changed to a screen 1140.

As described with reference to FIG. 11, the screens 1100 through 1140 of FIG. 11 show that the front and back input units 203 and 204 are predetermined user input interfaces of the object 1101, a first function (zooming-in or zooming-out) previously set for the object 1101 is performed in response to a user's input that is input through the front input unit 203, and a second function (a photographing screen change or a photographing region change) previously set for the object 1101 is performed in response to a user input that is input through the back input unit 204.

FIG. 11 may be applied to a panorama function. The angle of the camera lens may be changed by a gesture input into the back input unit 204 used to capture a panoramic view in the picture object 1101. Additionally, a panoramic photo may be viewed by moving the panoramic photo or a view angle of the photo by using a gesture that is input into the back input unit 204.

Figure 12:
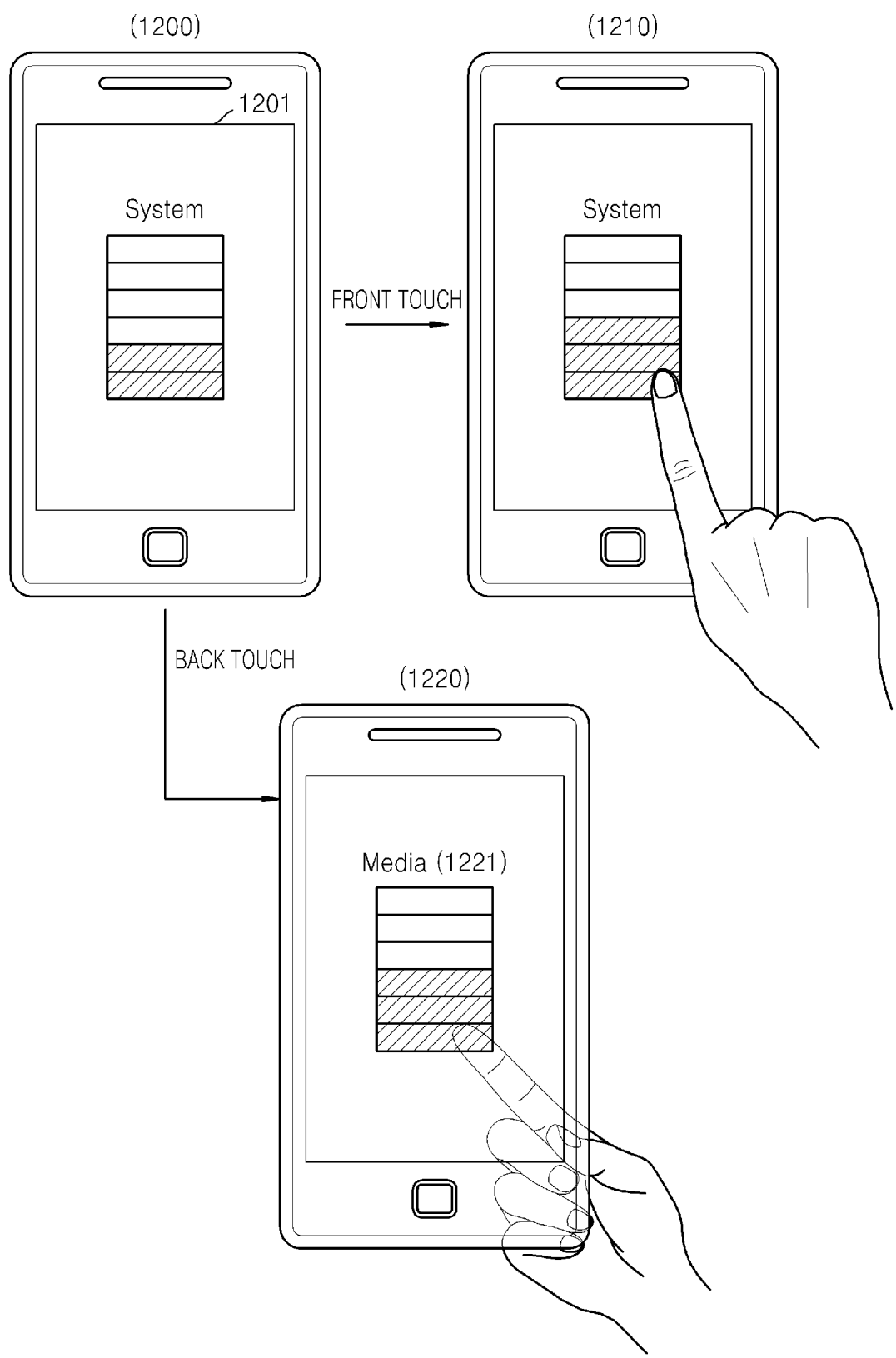

FIG. 12 shows another example screen of the object control process of FIG. 3. FIG. 12 shows screens relating to a system volume control function, such as control of a bell sound, and a volume control function when the device 200 plays media content.

When volume control is requested through the user input unit 205, if a screen 1200 is displayed, the system volume control is performed by a user's input with respect to the front input unit 203 (screen 1210), and the media volume control 1221 (i.e., a volume of a media file being reproduced) (screen 1220) is performed by a user's input with respect to the back input unit 204.

As described with reference to FIG. 9, the screens 1200 through 1220 of FIG. 12 show that the front and back input units 203 and 204 are predetermined user input interfaces of an object 1201, a first function (the system volume control function) previously set for the object 1201 is performed in response to the user's input that is input through the front input unit 203, and a second function (the media volume control function) previously set for the object 1201 is performed in response to the user's input that is input through the back input unit 204. If the user's input that is input through the front input unit 203 is detected, a message of the system volume control is displayed on the display unit 202, and, if the user's input that is input through the back input unit 204 is detected, a message 1221 of the media volume control is displayed on the display unit 202.

Figure 13:
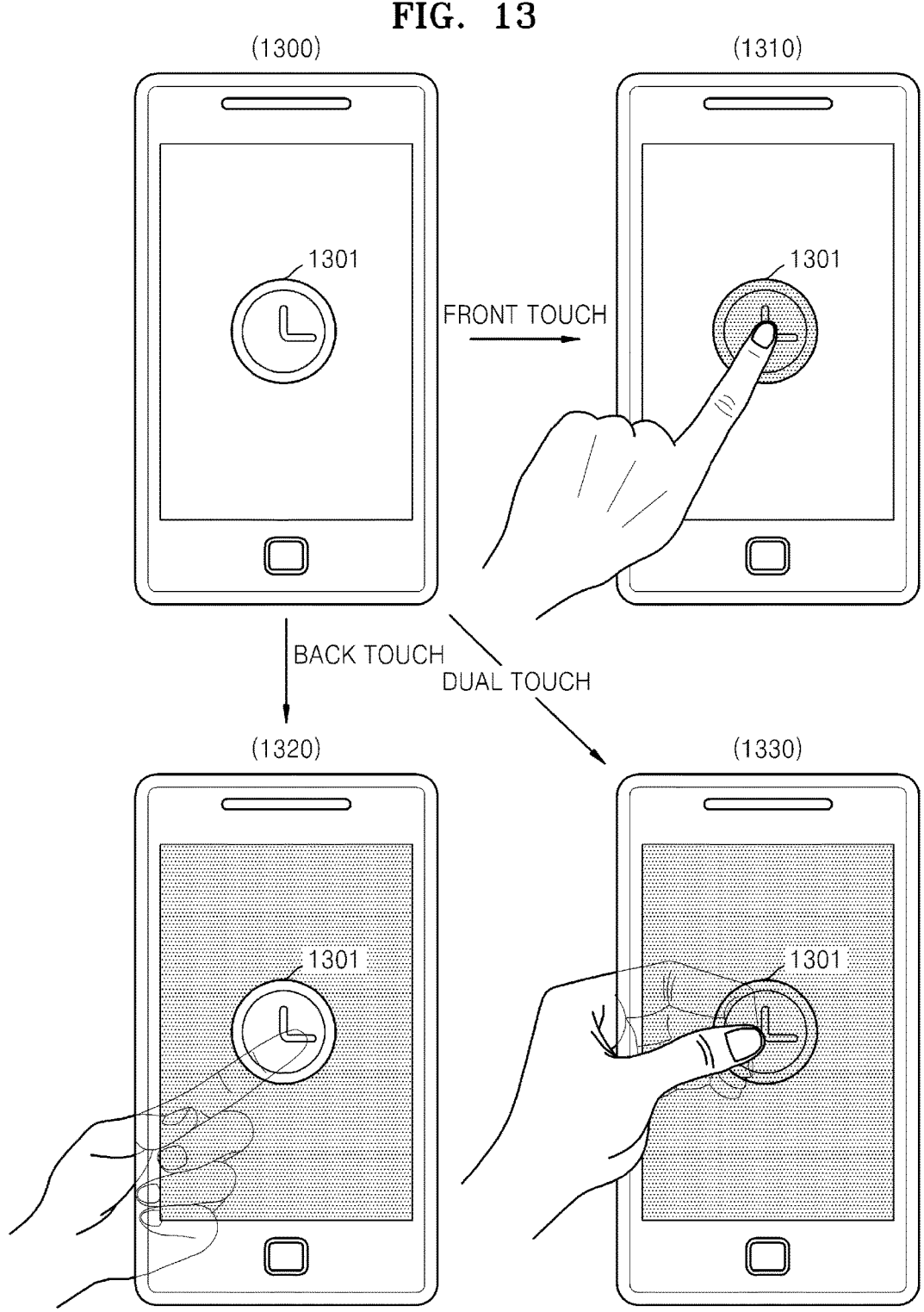

FIG. 13 shows another example screen of the object control process of FIG. 3. Screens 1300, 1310, 1320, and 1330 of FIG. 13 show different functions performed according to the front input unit 203 and the back input unit 204 that are predetermined input interfaces of an object 1301.

In more detail, the object 1301 enters an opaque state (the screen 1310) by a user touch with respect to the front input unit 203 of the object 1301 displayed on the screen 1300. A background excluding the object 1301 enters an opaque state (the screen 1320) by a user touch with respect to the back input unit 204 of the object 1301 displayed on the screen 1300. Both the background of the object 1301 and the object 1301 itself enter an opaque state (the screen 1330) by concurrent user touches with respect to the front input unit 203 and the back input unit 204 of the object 1301 displayed on the screen 1300.

FIG. 13 may be applied to a case where a user may intuitively see a difference in an editing target according to a touch surface when an object that is an image editing window is displayed. For example, a screen 1310 may display an inner region of an object 1301 set as the editing target by a user touch with respect to the front input unit 203 of the object 1301, a screen 1320 may display an outer region of the object 1301 set as the editing target by a user touch with respect to the back input unit 204 of the object 1301, and a screen 1330 may display the entire screen set as the editing target by user touches with respect to the front and back input units 203 and 204 of the object 1301.

Figure 14:
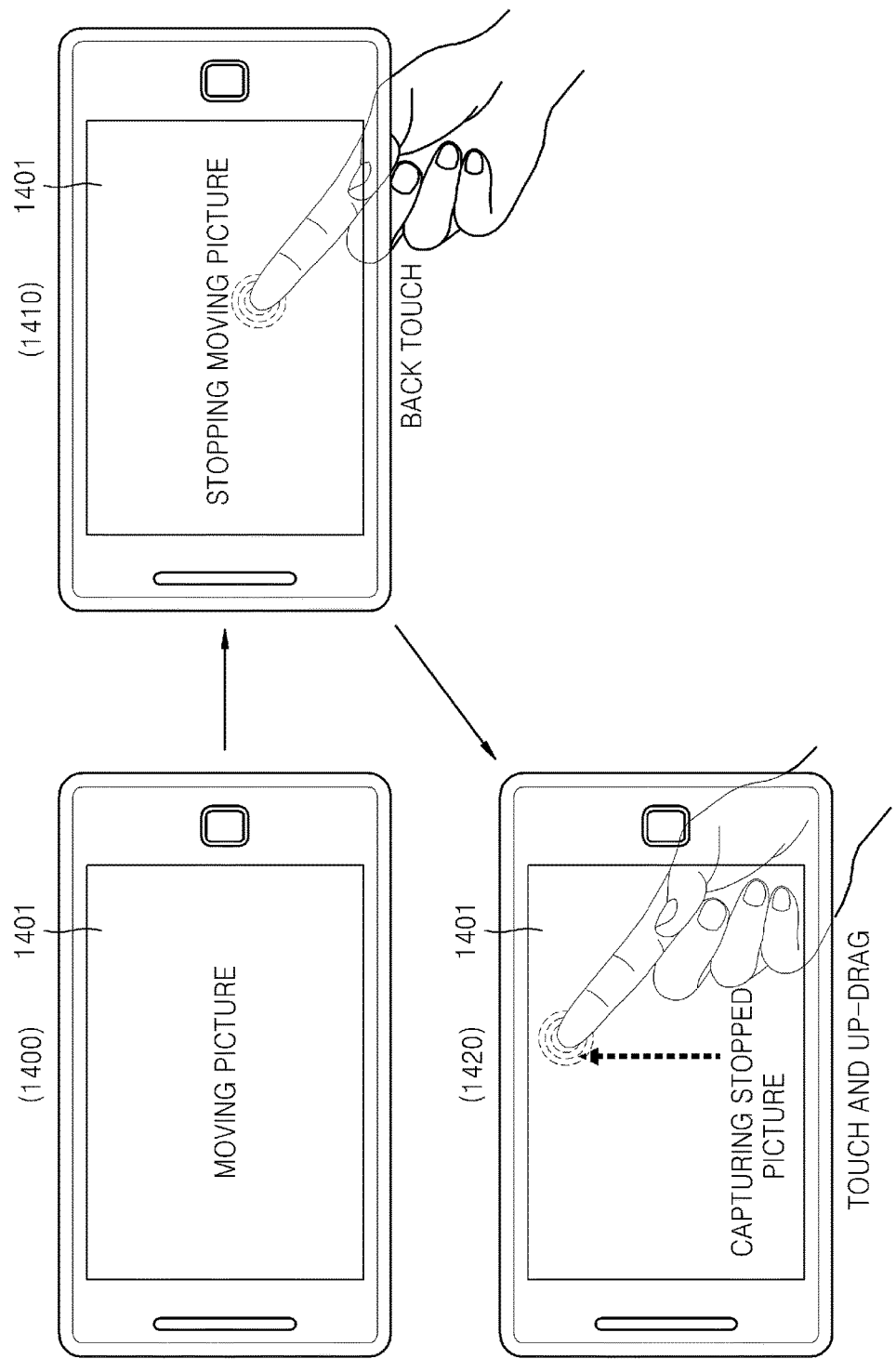

FIG. 14 shows another example screen of the object control process of FIG. 3. In FIG. 14, the front and back input units 203 and 204 are predetermined input interfaces of an object and perform different functions according to each input on the front and back surfaces.

That is, a screen 1400 shows reproduction of a moving picture according to a user's input that is input through the front input unit 203 with respect to an object 1401. Thus, basic functions (a fast forward function, a rewind function, a play function, etc.) related to production of the moving picture may be performed through the front input unit 203 during reproduction of the moving picture. While the moving picture is being reproduced, when the moving picture stopped (a screen 1410) according to a user touch with respect to the back input unit 204, and the stopped picture is captured (a screen 1420) according to a user's gesture into the back input unit 204. An example of the gesture may be a touching and dragging in an upward direction on the back input unit 204.

Figure 15:
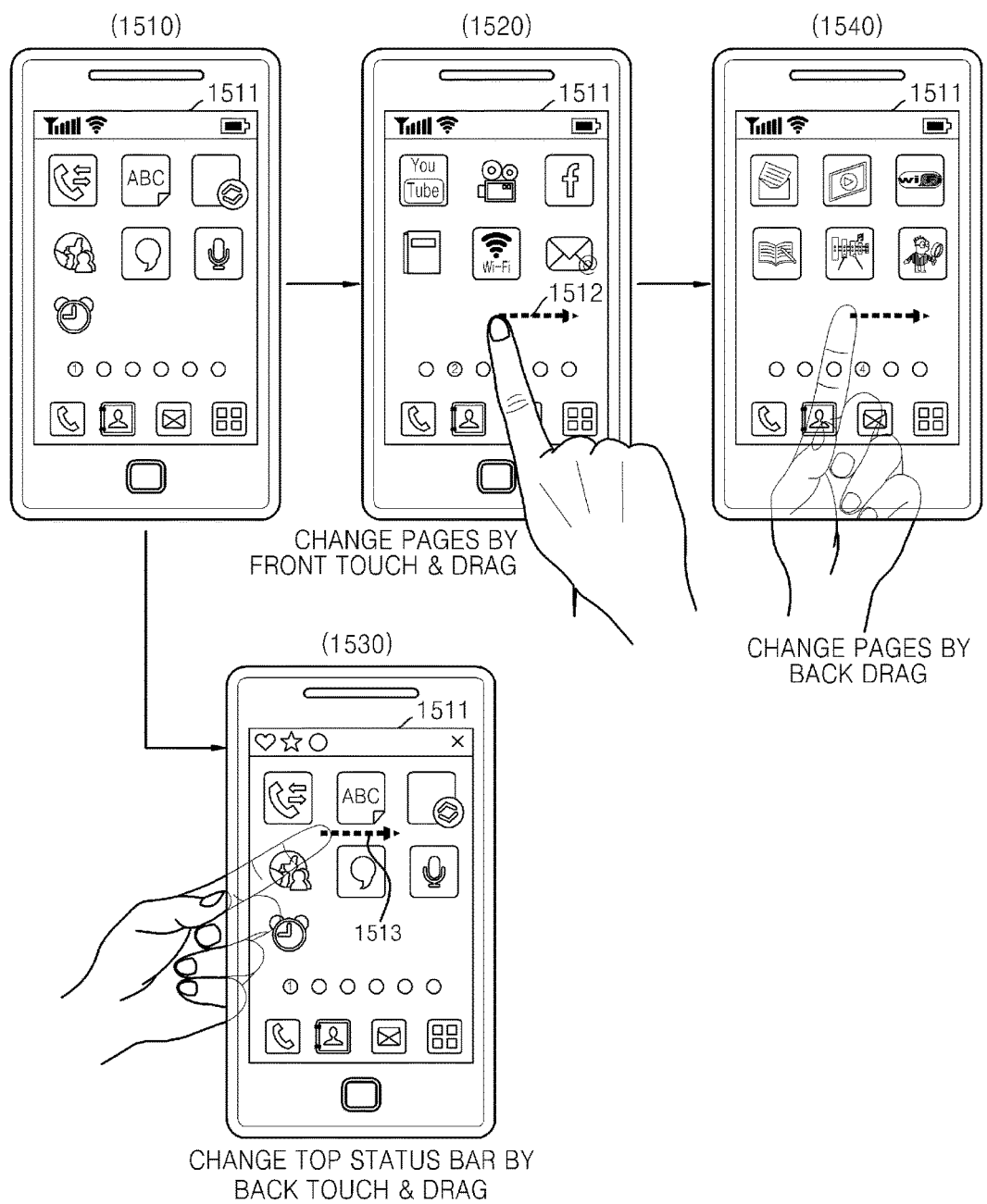

FIG. 15 shows another screen example of the object control process of FIG. 3. In FIG. 15, the front and back input units 203 and 204 are predetermined input interfaces of an object and perform different functions according to inputs into the front and back surfaces, respectively.

That is, pages are changed (screens 1510 and 1520) according to a user's touch & drag gesture with respect to the front input unit 203 of an object 1511. A top status bar moves in a drag direction according to the user's touch & drag gesture with respect to the back input unit 204 of the object 1511 and contents of the top status bar are changed (screens 1510 and 1530).

According to an exemplary embodiment, the number of pages skipped in a page changing function may be different as shown in a screen 1540 according to the user's touch & drag gesture with respect to the back input unit 204 and a screen 1520 according to the user's touch & drag gesture with respect to the front input unit 203. For example, every page may be changed according to the user's touch & drag gesture with respect to the front input unit 203 (screen 1520) and every second page may be changed according to the user's touch & drag gesture with respect to the back input unit 204 (screen 1540). Alternatively, pages provided according to the user's touch & drag gesture with respect to the front input unit 203 and pages provided according to the user's touch & drag gesture with respect to the back input unit 204 may be differently set.

Figure 16:
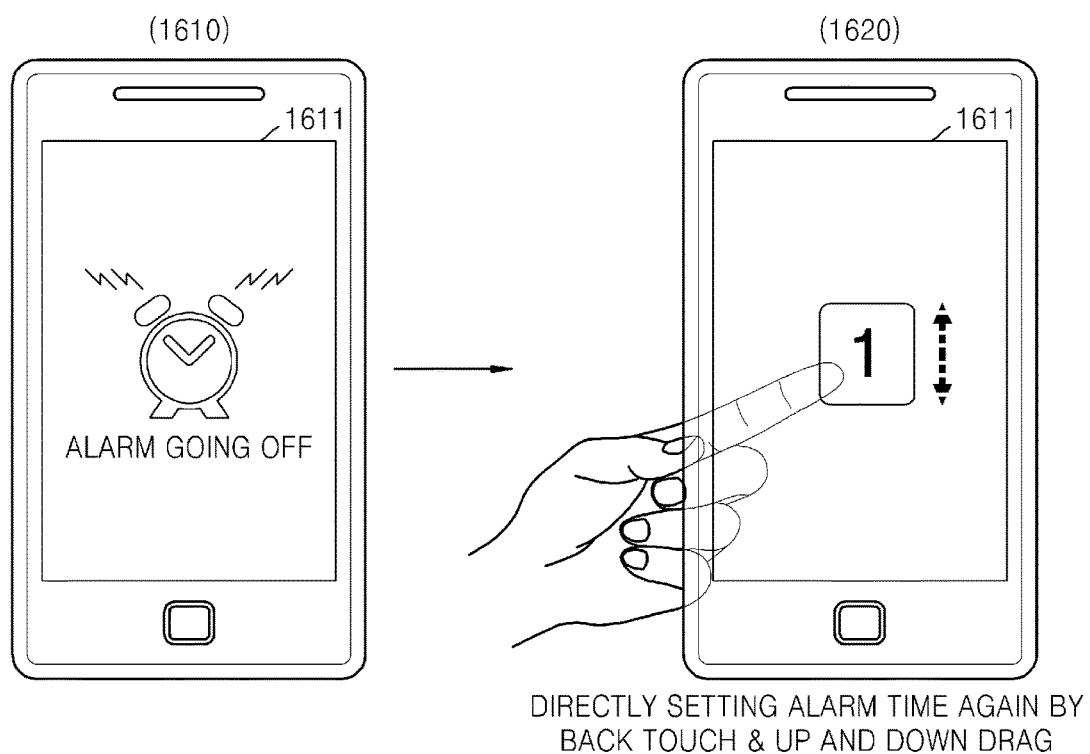

FIG. 16 shows another example screen of the object control process of FIG. 3. In FIG. 16, the front and back input units 203 and 204 are predetermined input interfaces of an object 1611 and perform different functions according to front and back surfaces.

That is, when an alarm goes off, the alarm may be stopped by a user's input with respect to the front input unit 203 of the object 1611 (screen 1610). In addition, an alarm time may be set again by a user's input with respect to the back input unit 204 (screen 1620). The alarm time may be touched and then dragged in upward or downward direction.

Figure 17:
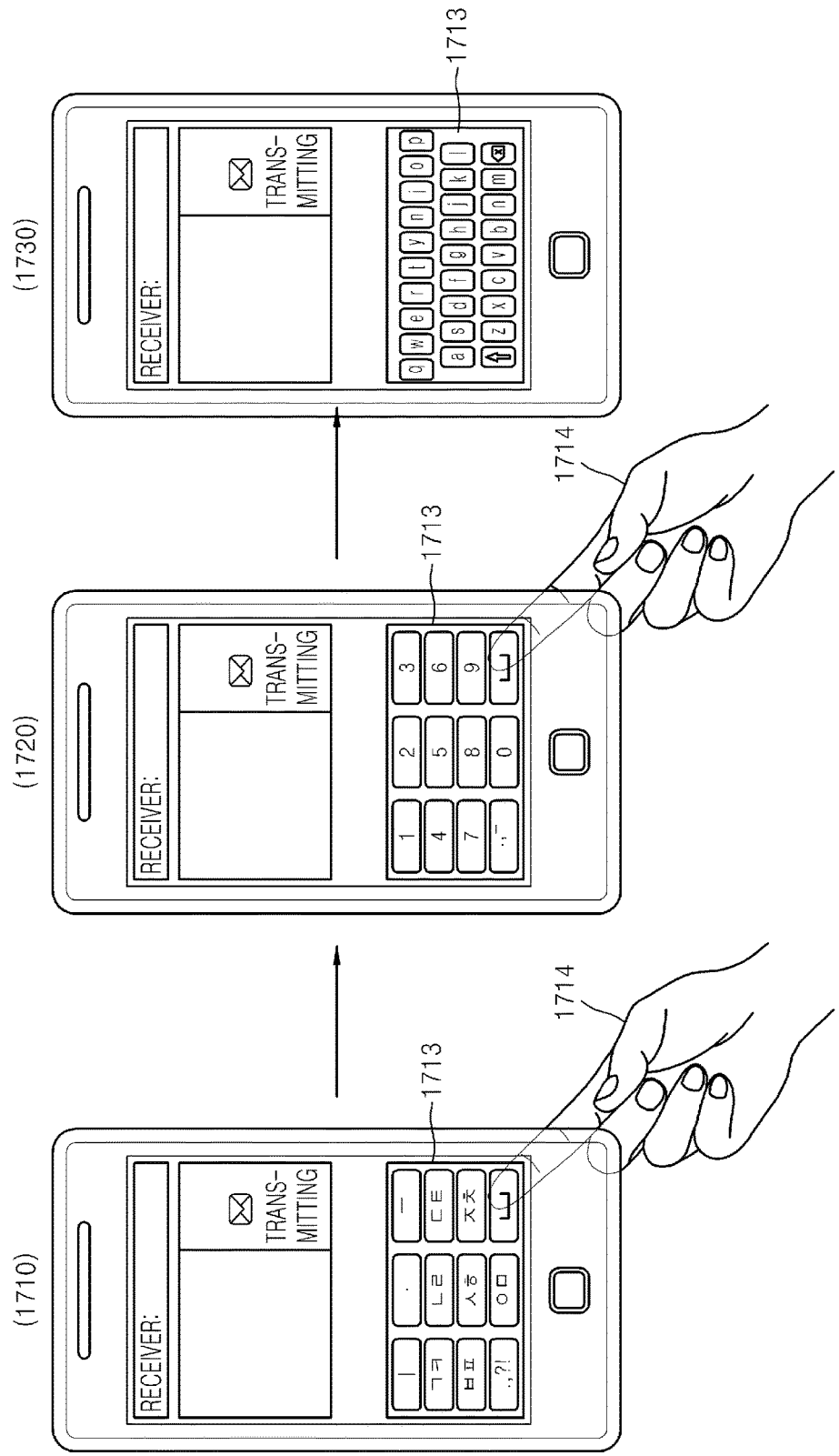

FIG. 17 shows another example screen of the object control process of FIG. 3. In FIG. 17, the front and back input units 203 and 204 are predetermined input interfaces of an object 1713 and perform different functions according to front and back surfaces.

Information is input according to virtual keys arranged by a user's input with respect to the front input unit 203 of the object 1713 and modes of the virtual keys are changed by a user's input 1714 with respect to the back input unit 204. That is, the object 1713 of a screen 1710 is changed to a number key arrangement of a screen 1720 by a one-time touch with respect to the back input unit 204 and changed to an alphabet key arrangement of a screen 1730 at a double touch with respect to the back input unit 204.

Figure 18:
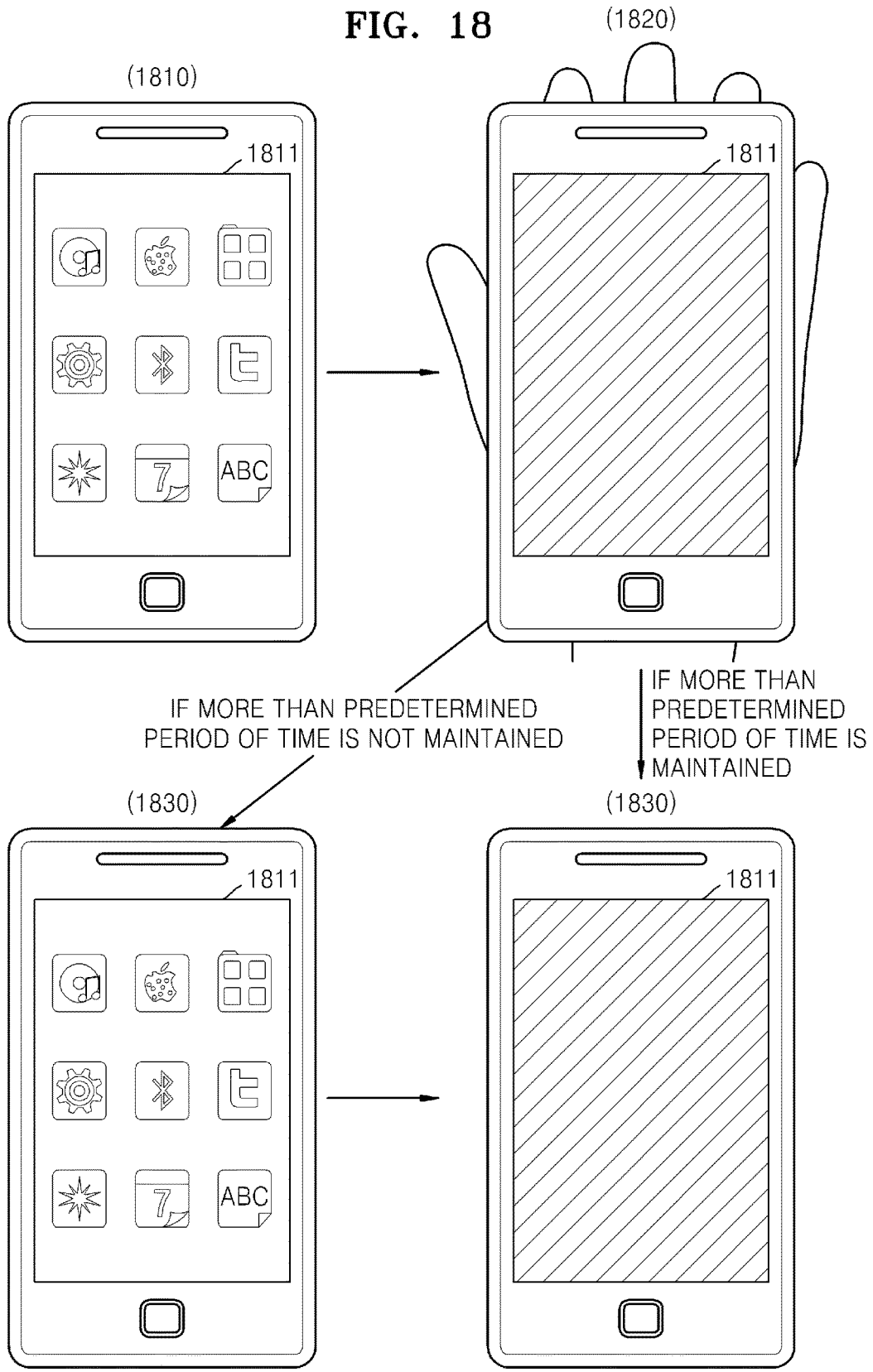

FIG. 18 shows screen example screen of the object control process of FIG. 3. In FIG. 18, a transparency of an object 1811 is set as a maximum value in response to a user's input that touches more than a predetermined area of the back input unit 204.

That is, when a screen 1810 is displayed on the display unit 202, if more than the predetermined area of the back input unit 204 is touched as shown on a screen 1820, a transparency of the display unit 202 may be set as a value between a maximum value and minimum value (i.e., maximum opaqueness). Although the transparency may be set as the maximum value by temporarily powering off the display unit 202, the exemplary embodiments are not limited thereto. According to an exemplary embodiment, a proximity sensor may be used to determine whether more than the predetermined area is touched.

If a touch gesture is not maintained for more than a predetermined period of time as shown on the screen 1820, the display unit 202 returns to screen 1830 which is displayed before a touch occurs. However, if the touch gesture is maintained for more than the predetermined period of time, the transparency of the display unit 202 is maintained in a status set as the maximum value (screen 1840). Although more than the predetermined period of time may be set as, for example, more than 3 minutes, the exemplary embodiments are not limited thereto.

Figure 19:
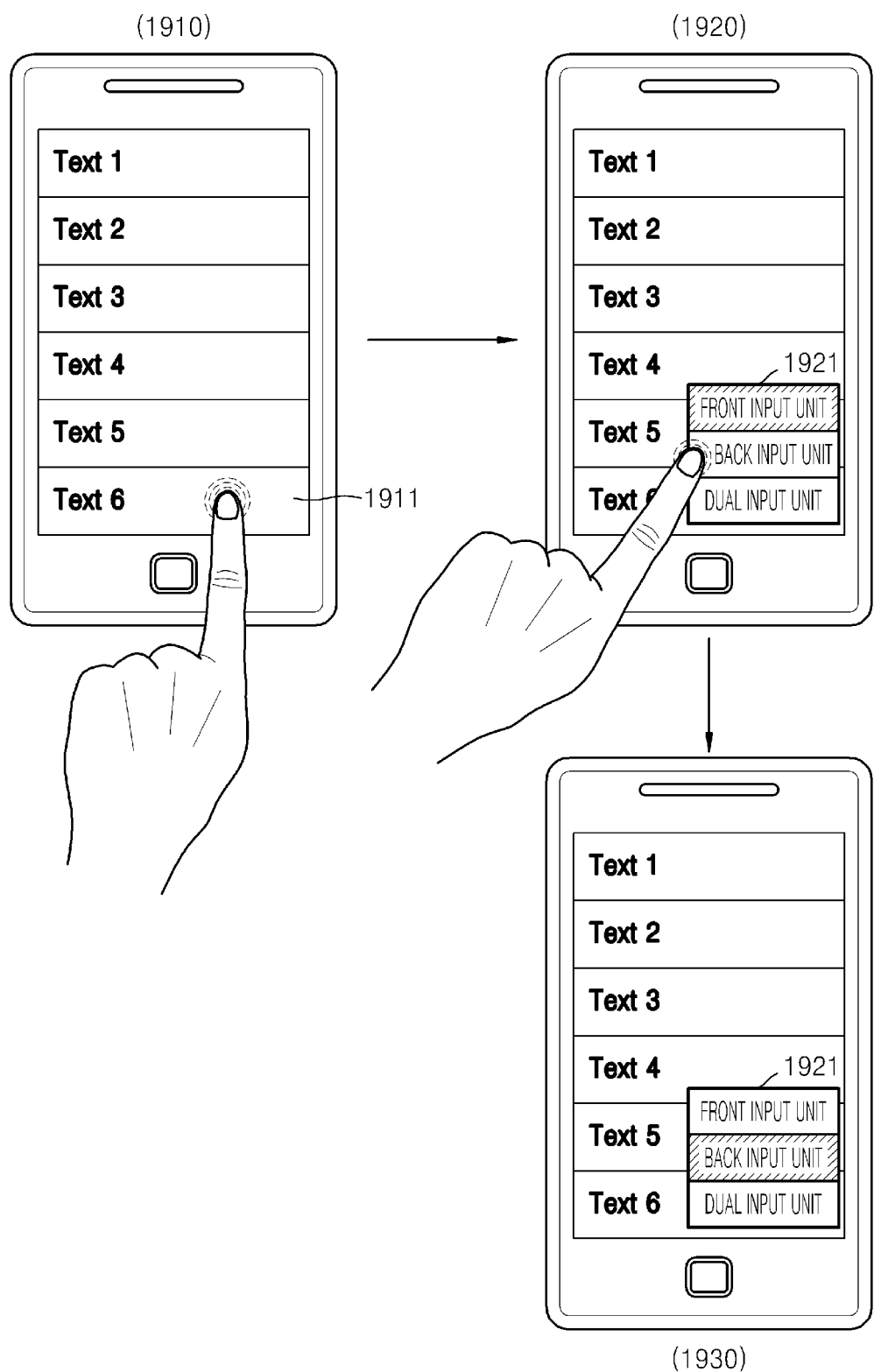

FIG. 19 shows another example screen of the object control process of FIG. 3. In FIG. 19, a predetermined input interface of an object 1911 is changed.

That is, an editing window 1921 including information regarding the predetermined input interface of the object 1911 in response to an input interface editing request with respect to the displayed object 1911 is displayed (screen 1910). The input interface editing request may be input by using a predetermined user's gesture or a menu through the front input unit 203 or the back input unit 204.

Information regarding the predetermined input interface of the object 1911 may be updated to input interface information 1921 changed by a user's input received based on the editing window 1921 (screens 1920 and 1930). In FIG. 19, the front input unit 203 that is predetermined with respect to the object 1911 is changed to the back input unit 204.

Figure 20:
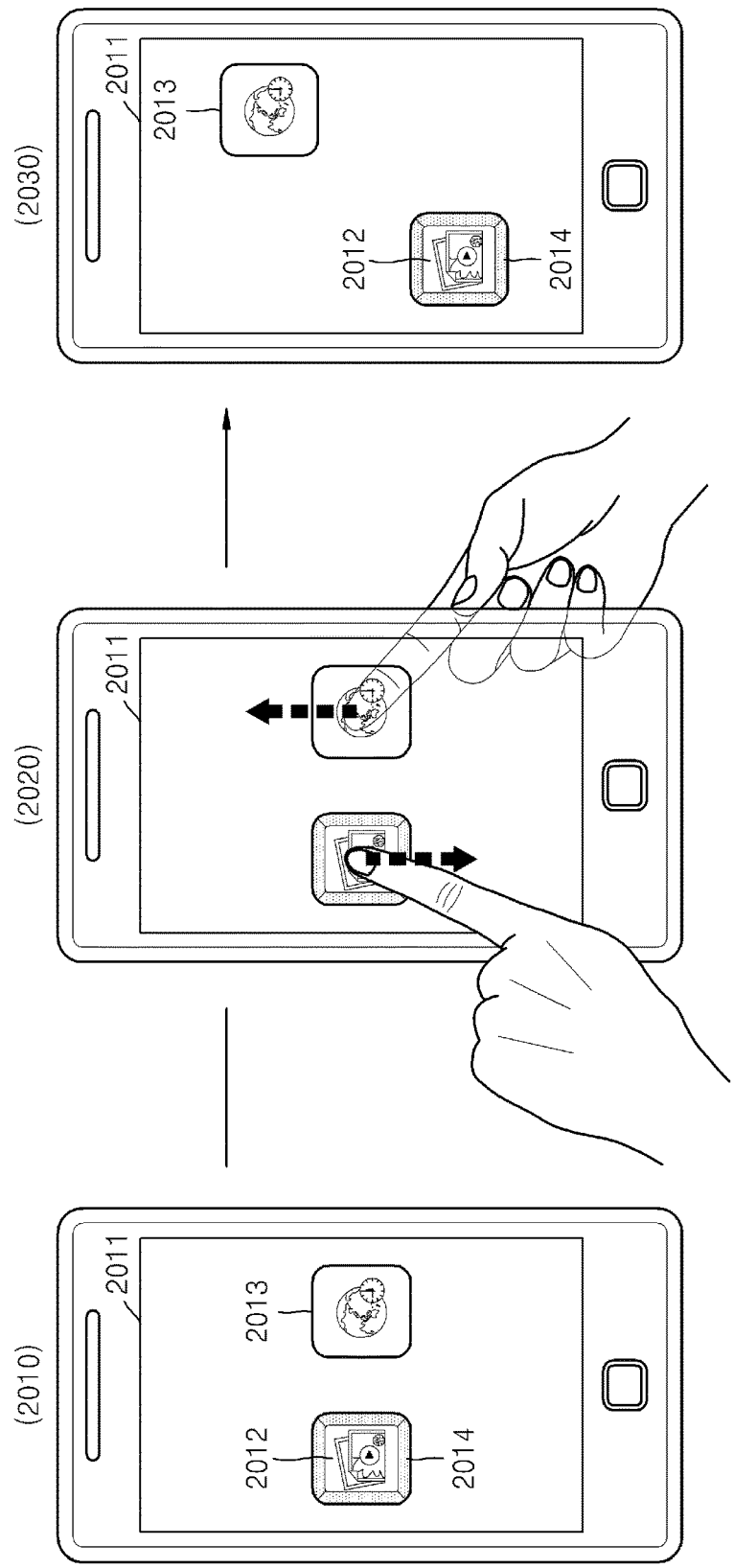

FIG. 20 shows another example screen of the object control process of FIG. 3. In FIG. 20, objects 2012 and 2013 for which different input interfaces are set are concurrently controlled according to user's inputs, which may be understood as multitasking.

That is, if a user's input with respect to the object 2012 on screen 2010 through the front input unit 203 and a user's input with respect to the object 2013 through the back input unit 204 are drag gestures to desired positions as shown on a screen 2020, display positions of the objects 2012 and 2013 are concurrently changed as shown on a screen 2030.

Reference numeral 2014 denotes screen information indicating a predetermined input interface of the displayed object 2012. The screen information 2014 may let a user intuitively know that the predetermined input interface of the displayed object 2012 is the front input unit 203.

The above-described screens of FIGS. 4 through 20 are provided according to operations of the processor 215. Also, the user's gestures described with reference to FIGS. 4 through 20 are not limited to those described above.

Figure 21:
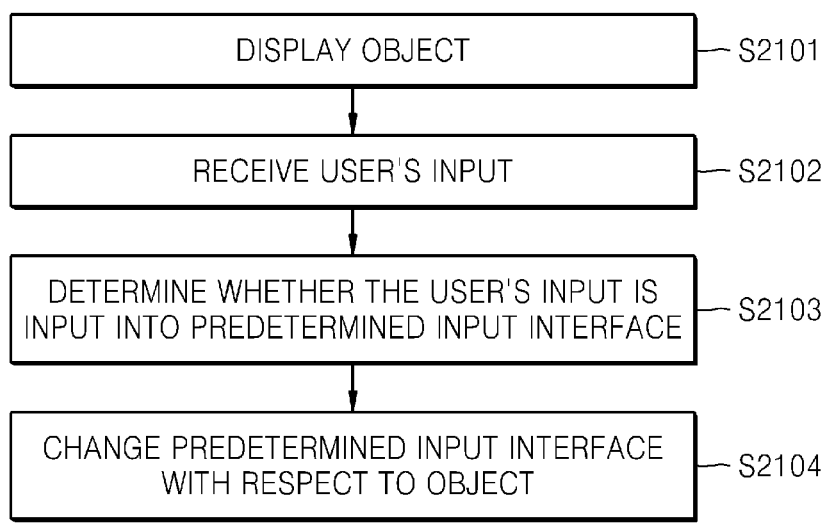
FIG. 21 is a flowchart of an object control method performed by a device including a transparent display, according to another exemplary embodiment.

FIG. 21 is a flowchart of an object control method performed by the device 200 including the transparent display 201, according to another exemplary embodiment. The object control method of FIG. 21 is also performed by the processor 215.

In FIG. 21, the object control operation of FIG. 3 is changed to an operation of rotating an object and updating a predetermined input interface of the object. Thus, operations S2101 through S2103 of FIG. 21 are the same as operations S301 through S303 of FIG. 3, and thus redundant descriptions will be omitted here.

As a result of a determination in operation S2103, when a user's input is received through a predetermined input interface of the object (for example, the front input unit 203 or the back input unit 204), and then a user's gesture that moves more than a predetermined length in one direction occurs, the processor 215 rotates the object in the direction corresponding to the user's gesture and changes the predetermined input interface of the object into another input interface (operation S2104). Accordingly, if the predetermined input interface of the object is the front input unit 203, the input interface of the object can be changed into the back input unit 204 according the user's input and the user's gesture. As described above, since the input interface for each object may be independently designated, user interfaces having a larger variety of shapes may be possible and a complexity of implementations according to the use of dual surfaces may be reduced. Also, as shown in FIG. 1, different input interfaces may be set for a plurality of objects displayed on a screen.

Figure 22A:
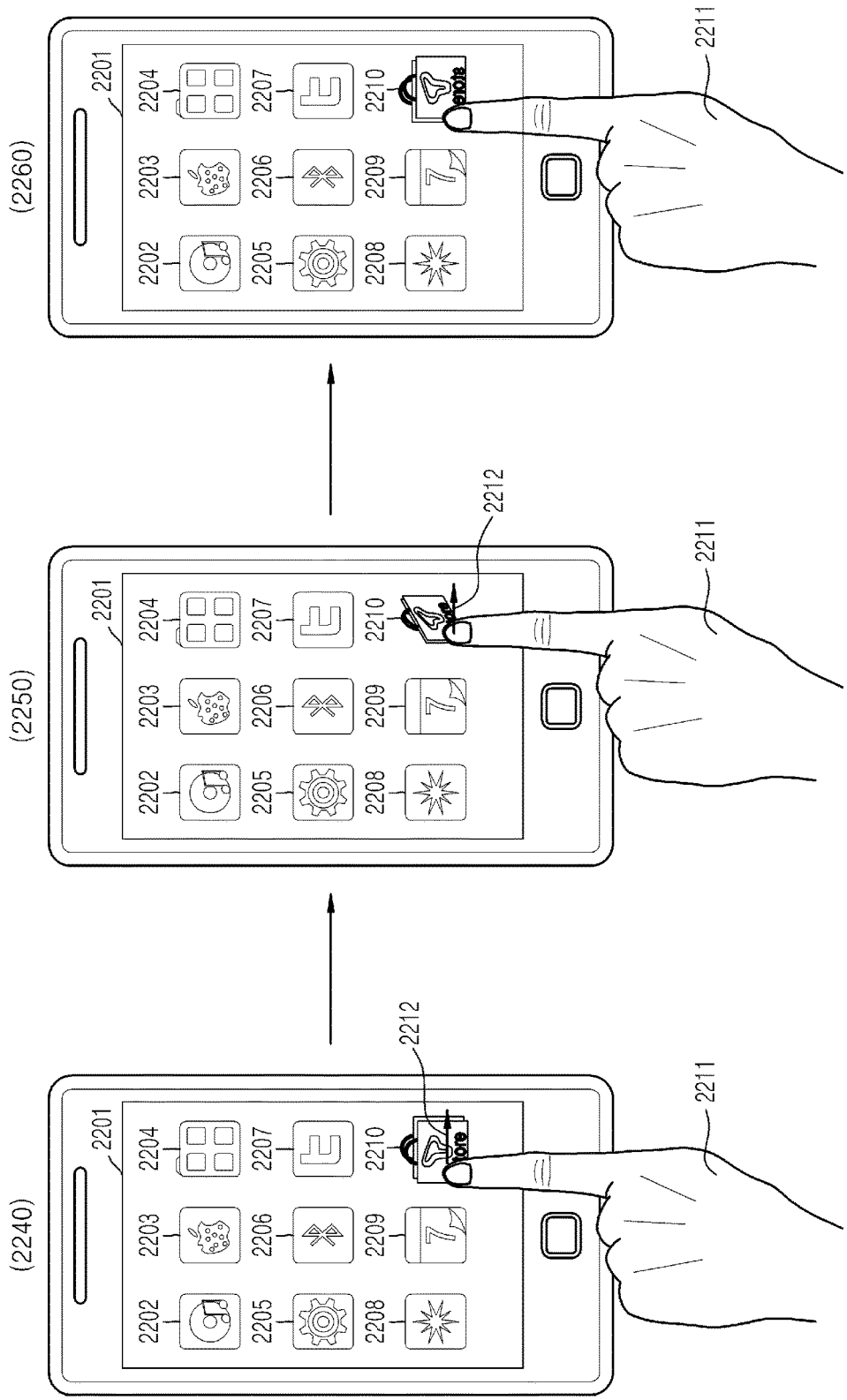

FIG. 22A shows an example screen of rotating an object 2210 from among a plurality of objects 2202-2210 and changing an input interface with respect to the object 2210. That is, a user gesture 2211 that moves in a direction 2212 with respect to the object 2210 occurs on a screen 2240, and thus the object 2210 rotates in the order as shown in screens 2250 and 2260. The object 2210 rotates by 180 degrees and thus front and back sides of an image of the object 2210 are changed on the screen 2260.

If a display surface of the object 2210 is changed according to the rotation of the object 2210, the processor 215 changes a predetermined input interface with respect to the object 2210 to the back input unit 204 (operation S2104).

FIG. 22B shows an example screen of changing functions corresponding to the front input unit 203 and the back input unit 204 according to the rotation of the object 2241 in a case where the object 2210 performs another function since different objects are set for the front input unit 203 and the back input unit 204.

That is, FIG. 22B is a case where an application that sets the front input unit 203 of the object 2241 as an input interface for a mini diary, and an application that sets the back input unit 204 as an input interface for a store. According to the above-described rotation in a direction 2242 as shown on screen 2240, 2250, 2260, the store application is displayed on a front side of device 200, the input interface of the store application is set as the front input unit 203, the mini diary application is displayed on back side of device 200, the input interface of the mini diary application is set as the back input unit 204. Accordingly, the device 200 may perform a store function as a user's input received through the front input unit 203 of the object 2241, and a mini diary function as a user's input received through the back input unit 204 of the object 2241.

Figure 23:
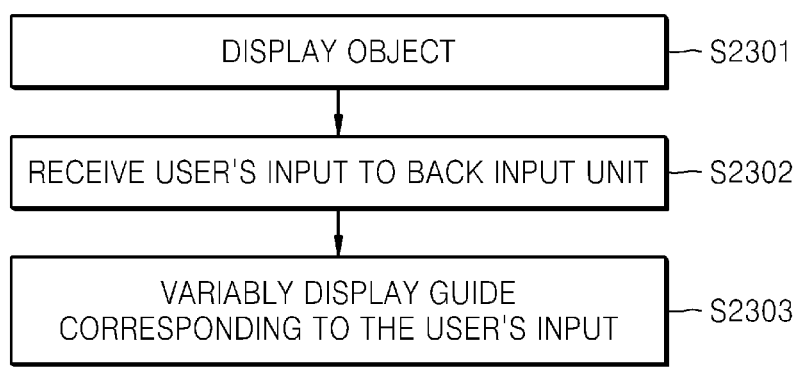
FIG. 23 is a flowchart of a display method of a guide display on a device including a transparent display, according to another exemplary embodiment.

FIG. 23 is a flowchart of a guide display method performed by the device 200 including the transparent display 201, according to an exemplary embodiment. The guide display method is performed by the processor 215. A guide may include any information indicating a position (a touch position) at which a user's input is sensed with respect to the back input unit 204.

The processor 215 displays at least one object on the display unit 203 according to an execution of an arbitrary application (operation S2301). If the input unit 204 receives a user's input irrespective of a predetermined input interface with respect to the displayed object (operation S2302), the guide displays a position where the user's input is received (operation S2303). The guide may be variably displayed based on a status of the object displayed on a point where the user's input is received or a status of the display unit 203. The guide is referred to as an indicator.

The status of the object or the status of the display unit 203 may include a status based on a transparency. Thus, guides having different images or different transparencies may be displayed according to the transparency of the object or the display unit 203. The transparency of the object may consider a transparency of a region adjacent to the object. The status of the display unit 203 may include touch intensity.

Figure 24:
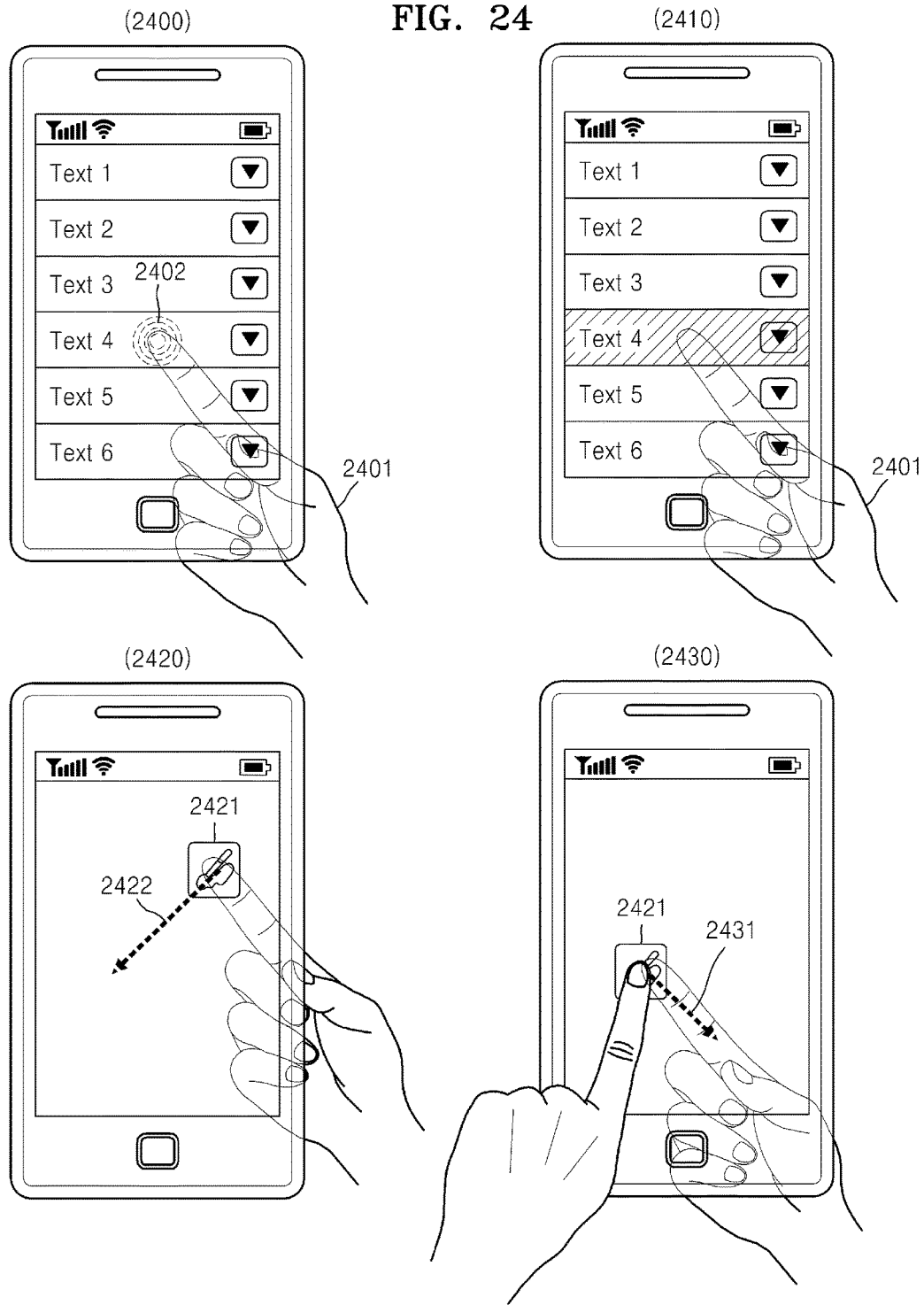
FIG. 24 illustrates examples of screens of displaying a guide.

FIG. 24 shows example screens of displaying a guide. A screen 2400 of FIG. 24 may let a user intuitively know that a text 4 object included in a list is touched through the back input unit 204 as a user's input 2401 is sensed through the back input unit 204 with respect to the text 4 object and thus a virtual guide 2402 is displayed on a position of the text 4 object. Also, the user may intuitively know a touch intensity used to touch the back input unit 204 according to a variation in the transparency of the guide.

A screen 2410 displays a virtual guide on the entire surface on which a selected object is displayed. The screen 2410 may let the user intuitively know an occurrence of a user touch through the back input unit 204 with respect to the text 4 object. A color of a field of the text 4 object may vary according to the touch intensity.

Also, when an object 2421 is moved in a direction 2422 by touching and dragging the back input unit 204 as shown on a screen 2420, in a case where the object 2421 is touched through the front input unit 203 while the touch on the back input unit 204 is maintained, an operation performed in the back input unit 204 with respect to the object 2421 may be continued. That is, an operation of moving the object 2421 in a direction 2431 by touching and dragging the object 2421 may be continuously performed as shown on a screen 2430.

Figure 25:
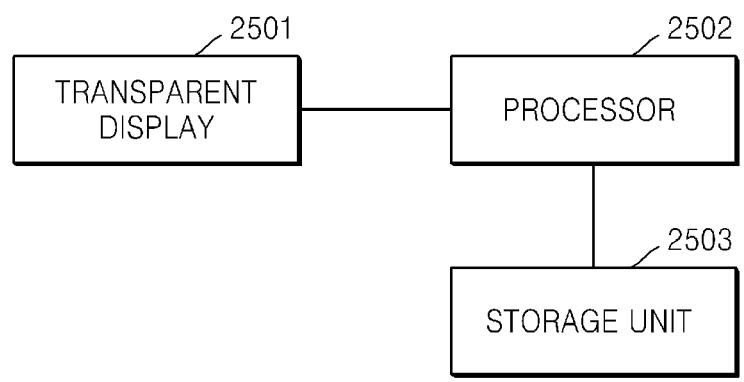
FIG. 25 is a block diagram of a device including a transparent display, according to an exemplary embodiment.

FIG. 25 is a block diagram of a device according to an exemplary embodiment.

Referring to FIG. 25, the device may include the transparent display 2501, a processor 2502, and a storage unit 2503.

The transparent display 2501 includes the front input unit 203, the back input unit 204, and the display unit 202, like the transparent display 201 of FIG. 2A. The transparent display 2501 receives a touch input of a user through at least one of the front input unit 203 and the back input unit 204, and displays an object corresponding to the touch input of the user.

The storage unit 2503 stores information regarding a predetermined input interface with respect to at least one object and programs for executing an object control method and a guide display method according to an exemplary embodiment. That is, data according to a software structure shown in FIG. 26 may be stored in the storage unit 2503. The storage unit 211 of FIG. 2A may also store programs and resources according to the software structure shown in FIG. 26.

Figure 26:
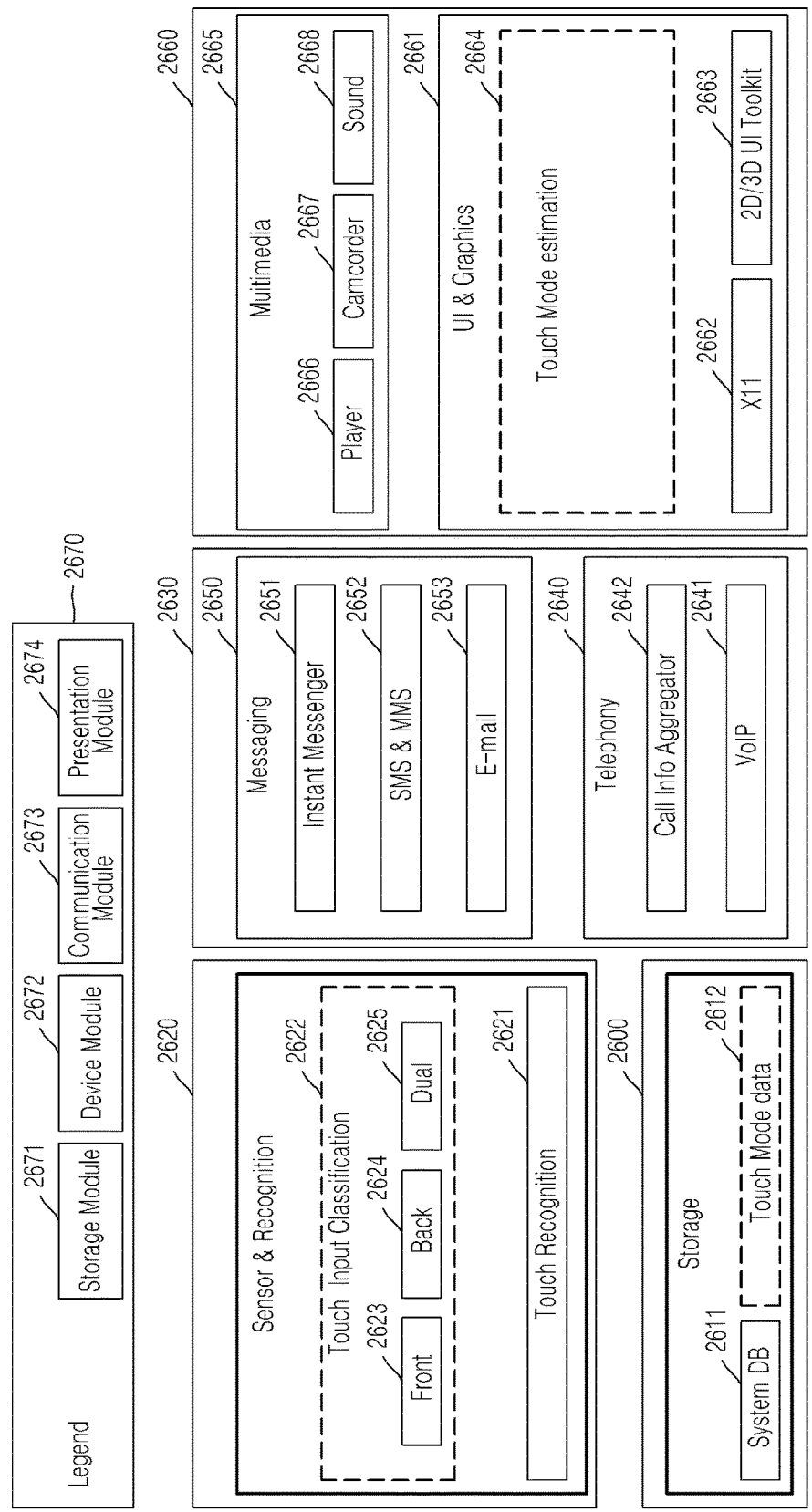
FIG. 26 is a diagram illustrating software stored in a storage unit of a device including a transparent display, according to an exemplary embodiment.

In particular, touch mode data 2612 including a setting value with respect to a touch mode or predetermined user input interface of each object of FIG. 26, a touch input classification module 2622 that classifies input touches, and a touch mode estimation module 2664 may be mainly used.

FIG. 26 is a diagram for explaining a software layer stored in a storage unit of a device including a transparent display, according to an exemplary embodiment.

Referring to FIG. 26, the software layer includes a storage module 2600, a sensor & recognition module 2620, a messaging module 2650, a telephony module 2640, a multimedia module 2665, an UI & graphic module 2661, and a legend module 2670 but the software layer is not limited thereto.

The storage module 2600 includes a system database 2611 that is a general data storage unit such as an address book, environment information, etc. and a touch mode data region 2612 that stores a setting value with respect to a touch mode of each object according to the present invention.

The sensor & recognition module 2620 includes a module 2621 that recognizes touches in the front input unit 203 and the back input unit 204 and a module 2622 that classifies input touches. The module 2622 that classifies input touches includes a front input mode 2623 that transfers an input with respect to the front input unit 203 to an event processor 2662, a back input mode 2624 that transfers an input with respect to the back input unit 204 to the event processor 2662, and a dual mode 2625 that transfers inputs with respect to dual touches (the front input unit 203 and the back input unit 204) to the event processor 2662.

The messaging module 2650 includes an instant module 2651 regarding conversation between users through an Internet connection, a module 2652 regarding short message service (SMS) text messages and multimedia messages, and a module 2653 for emailing.

The telephony module 2640 includes an information retrieval module 2642 for facilitating a call connection and a voice service module 2641 for transmitting voice over the Internet based on voice over Internet protocol (VoIP).

The multimedia module 2665 includes a moving picture play module 2666, a moving picture and still picture photographing module 2667, and a sound play module 2668.

The UI & graphic module 2661 includes an X11 module 2662 that is for receiving a touch input by a window manager, a module 2663 that outputs all objects seen by a user on a screen, and an estimation module 2664 regarding a mode setting value stored for each object and a current touch input.

As described above, programs having various structures may be stored in the storage unit 2503 and are not limited to those shown in FIG. 26.

The processor 2502 may perform operations according to the above-described exemplary embodiments by using the programs stored in the storage unit 2503. The processor 2502 controls a transparent display to display at least one object, determines whether a user's input received through at least one input interface has been input to a predetermined input interface with respect to the object, and controls the object based on the determination.

The object control method or the guide display method according to exemplary embodiments may also be embodied as computer readable codes stored on a computer readable recording medium such a non-transitory computer readable medium. The computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium may be distributed among computer systems that are interconnected through a network, and an exemplary may be stored and implemented as computer readable code in the distributed system.

While exemplary embodiments have been particularly shown and described, it will be understood by those of ordinary skill in the art that various changes in form and details may be made therein without departing from the spirit and scope of the inventive concept as defined by the following claims.

What is claimed is:

1. An object control method performed by a device comprising a transparent display, the method comprising:
   displaying a first object and a second object on the transparent display, wherein a touch input of the first object differs from a touch input of the second object, and a display position of the first object on the transparent display is the same as a display position of the second object on the transparent display;
   in response to receiving the touch input on the first object through a first surface of the transparent display while the first object and the second object are displayed, executing an object-specific function corresponding to the first object;
   in response to receiving the touch input on the second object through a second surface of the transparent display while the first object and the second object are displayed, executing an object-specific function corresponding to the second object; and
   in response to receiving the touch input on the first object and the touch input on the second object, controlling concurrently the object-specific function corresponding to the first object and the object-specific function corresponding to the second object.

2. The method of claim 1, further comprising:
   in response to receiving a touch input on a third object being displayed on the transparent display through at least one of the first surface and the second surface, executing an object-specific function corresponding to the third object.

3. The method of claim 1, wherein the first surface is one of a front surface of the transparent display and a back surface of the transparent display, and
   wherein the second surface is the other one of the front surface of the transparent display and the back surface of the transparent display.

4. The method of claim 1, wherein, when the second object is displayed on a front surface of the first object,
   the object-specific function corresponding to the second object comprises changing a display status of the second object.

5. The method of claim 1, wherein, when the first object is displayed on a first layer that is partially overlapping the second object being displayed on a second layer below the first layer,
   the object-specific function corresponding to the second object comprises moving the second object in response to receiving the touch input on the second object through the second surface.

6. The method of claim 1, wherein, when the first object is displayed on a first layer that is partially overlapping the second object being displayed on a second layer below the first layer,
   the object-specific function corresponding to the second object comprises displaying the second object above the first object in response to receiving the touch input on the second object through the second surface.

7. The method of claim 1, further compromising:
   in response to receiving a touch input activating more than a predetermined area of at least one of the first surface and the second surface,
   setting a transparency of the at least one of the first surface and the second surface of the transparent display that the touch input activating more than the predetermined area is received as a maximum value.

8. The method of claim 7, further comprising:
   if the touch input activating more than the predetermined area is maintained for less than a predetermined period of time, returning to the transparency of the at least one of the first surface and the second surface of the transparent display before receiving the touch input activating more than the predetermined area.

9. The method of claim 1, further comprising:
   displaying an editing window comprising information for selecting at least one of the first surface and the second surface with respect to at least one of the first object and the second object in response to a receiving editing request regarding a surface of the transparent display for the at least one of the first object and the second object;
   assigning a surface corresponding to the at least one of the first object and the second object according to an input of a user through the editing window; and
   updating the information regarding the surface corresponding to the at least one of the first object and the second object based on the assigning.

10. The method of claim 1, wherein the touch input on the first object comprises moving more than a predetermined length in one direction through the first surface, wherein the object-specific function corresponding the first object comprises changing the first surface to the second surface by rotating the first object in a direction corresponding to the touch input, wherein the touch input on the second object comprises moving more than a predetermined length in one direction through the second surface, and wherein the object-specific function corresponding to the second object comprises changing the second surface to the first surface by rotating the second object in a direction corresponding to the touch input.

11. The method of claim 1, wherein the object-specific function corresponding to the second object comprises variably displaying an indicator corresponding to the touch input on the second object based on a status of the second object or a status of the transparent display.

12. The method of claim 1, wherein the object-specific function corresponding to the second object comprises displaying a guide corresponding to a location of the touch input on the second object.

13. A non-transitory computer readable medium having recorded thereon instructions which are executed by a computer to perform the method of claim 1.

14. A device which performs an object control method, the device comprising:
a transparent display configured to display a first object and a second object, wherein a touch input of the first object differs from a touch input of the second object, and a display position of the first object on the transparent display is the same as a display position of the second object on the transparent display;
an input interface configured to receive a touch input through at least one of a first surface and a second surface of the transparent display;
a storage configured to store information regarding the first object, the second object, the first surface and the second surface; and
a processor configured to, in response to receiving the touch input on the first object through the first surface of the transparent display while the first object and the second object are displayed, execute an object-specific function corresponding to the first object;
in response to receiving the touch input on the second object through the second surface of the transparent display while the first object and the second object are displayed, execute an object-specific function corresponding to the second object; and
in response to receiving the touch input on the first object and the touch input on the second object, control concurrently the object-specific function corresponding to the first object and the object-specific function corresponding to the second object.

15. The device of claim 14, wherein the processor is further configured to, in response to receiving a touch input on a third object being displayed on the transparent display through at least one of the first surface and the second surface, execute an object-specific function corresponding to the third object.

16. The device of claim 14, wherein the first surface is one of a front surface and a back surface of the transparent display, and wherein the second surface is another of one of the front surface and the back surface of the transparent display.

17. The device of claim 14, wherein the object-specific function corresponding the second object comprises variably displaying an indicator corresponding to the touch input on the second object based on a status of the second object or a status of the transparent display.

18. The device of claim 14, wherein the object-specific function corresponding to the second object comprises displaying a guide corresponding to a location of the touch input on the second object.

19. The device of claim 14, wherein the processor is further configured to,
in response to receiving a touch input activating more than a predetermined area of at least one of the first surface and the second surface, set a transparency of the at least one of the first surface and the second surface of the transparent display on which the touch input activating more than the predetermined area is received as a maximum value.

20. The device of claim 19, wherein the processor is further configured to, if the touch input activating more than the predetermined area is not maintained for more than a predetermined period of time, return to the transparency of the at least one of the first surface and the second surface of the transparent display before receiving the touch input activating more than the predetermined area.

21. The device of claim 14, wherein, when the second object is displayed on a front surface of the first object, the object-specific function corresponding to the second object comprises changing a display status of the second object.

22. The device of claim 14, wherein, when the first object is displayed on a first layer and partially overlapping the second object displayed on a second layer below the first layer, the object-specific function corresponding to the second object comprises moving the second object in response to receiving the touch input on the second object through the second surface.

23. The device of claim 14, wherein, when the first object is displayed on a first layer and partially overlaps the second object displayed on a second layer below the first layer, the object-specific function corresponding to the second object comprises displaying the second object above the first object in response to receiving the touch input on the second object through the second surface.

24. The device of claim 14, wherein the processor is further configured to, in response to receiving an editing request regarding a surface of the transparent display for at least one of the first object and the second object, display an editing window comprising information for selecting regarding at least one of the first surface and the second surface with respect to the at least one of the first object and the second object;
assigning a surface corresponding to the at least one of the first object and the second object according to an input of a user through the editing window; and
updating the information regarding the surface corresponding to the at least one of the first object and the second object based on the assigning.

* * * * *